United States Patent
Wu et al.

(10) Patent No.: US 11,937,215 B2
(45) Date of Patent: Mar. 19, 2024

(54) SIDELINK POSITIONING REFERENCE SIGNAL TRANSMISSION WITH CROSS-POOL RESOURCE RESERVATION

(71) Applicant: QUALCOMM Incorporated, San Diego, CA (US)

(72) Inventors: Shuanshuan Wu, San Diego, CA (US); Kapil Gulati, Belle Mead, NJ (US); Gabi Sarkis, San Diego, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 353 days.

(21) Appl. No.: 17/488,051

(22) Filed: Sep. 28, 2021

(65) Prior Publication Data

US 2023/0096178 A1 Mar. 30, 2023

(51) Int. Cl.
*H04W 72/02* (2009.01)
*H04L 5/00* (2006.01)
*H04W 28/26* (2009.01)
*H04W 72/51* (2023.01)
*H04W 92/18* (2009.01)

(52) U.S. Cl.
CPC ........... *H04W 72/02* (2013.01); *H04L 5/0051* (2013.01); *H04W 28/26* (2013.01); *H04W 72/51* (2023.01); *H04W 92/18* (2013.01)

(58) Field of Classification Search
CPC ...... H04L 5/005; H04W 92/18; H04W 28/26; H04W 72/51; H04W 72/02
See application file for complete search history.

(56) References Cited

U.S. PATENT DOCUMENTS

2021/0219268 A1* 7/2021 Li ..................... H04W 72/20
2022/0039080 A1* 2/2022 Khoryaev ............... H04W 4/40

OTHER PUBLICATIONS

Apple Inc: "On Rel-18 Positioning", 3GPP TSG RAN Meeting #93-e, RP-212368, 3rd Generation Partnership Project, Mobile Competence Centre, 650, Route Des Lucioles, F-06921 Sophia-Antipolis Cedex, France, vol. TSG RAN, No. Electronic Meeting, Sep. 13, 2021-Sep. 17, 2021, 7 Pages, Sep. 6, 2021, XP052050343, sections 1, 2.

(Continued)

*Primary Examiner* — Hassan A Phillips
*Assistant Examiner* — Prenell P Jones
(74) *Attorney, Agent, or Firm* — Thien T. Nguyen

(57) ABSTRACT

Aspects relate cross-pool resource reservations of resources for sidelink-positioning reference signals (SL-PRS). A wireless communication device can transmit a first SL-PRS resource reservation message within resources in a SL communication resource pool. The first SL-PRS resource reservation message may identify a first SL-PRS resource within a SL-PRS resource pool. The wireless communication device can also transmit a first SL-PRS in the first SL-PRS resource within the SL-PRS resource pool. The wireless communication device can also receive a second SL-PRS resource reservation message within resources in the SL communication resource pool. The second SL-PRS resource reservation message may identify a second SL-PRS resource within the SL-PRS resource pool. The wireless communication device may then receive a second SL-PRS in second SL-PRS resource within the SL-PRS resource pool. The SL communication resource pool may be different from the SL-PRS resource pool.

30 Claims, 12 Drawing Sheets

(56) References Cited

OTHER PUBLICATIONS

International Search Report and Written Opinion—PCT/US2022/042771—ISA/EPO—dated Dec. 19, 2022.
Nokia et al., "Email Discussion Summary for [RAN-R18-WS-non-eMBB-Nokia]", 3GPP TSG RAN Rel-18 workshop, RWS-210584, 3rd Generation Partnership Project, Mobile Competence Centre, 650, Route Des Lucioles, F-06921 Sophia-Antipolis Cedex, France, vol. TSG RAN, No. Electronic Meeting, Jun. 28, 2021-Jul. 2, 2021, 45 Pages, Jun. 25, 2021, XP052029049, section 2.

* cited by examiner

☒ 802 SL-PRS of UE-1    ☒ 804 SL-PRS of UE-2    ☒ 806 SL-PRS of UE-3

SIDELINK POSITIONING REFERENCE SIGNAL TRANSMISSION WITH CROSS-POOL RESOURCE RESERVATION

TECHNICAL FIELD

The technology discussed below relates generally to wireless communication networks, and more particularly, to techniques for sidelink positioning reference signal transmission with cross-pool resource reservation.

BACKGROUND

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs over a proximity service (ProSe) PC5 interface. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

Positioning of UEs within a sidelink communication network may be facilitated through communication with a global navigation satellite system (GNSS). For example, a GNSS receiver within a UE may receive signals from multiple GNSS satellites and estimate the location of the UE based on the received signals. Sidelink UEs may further utilize range-based positioning to estimate their location. For example, UEs may exchange positioning reference signals (PRSs) over sidelinks to determine the relative distance between the UEs and/or the absolute position (e.g., geographical coordinates) of the UEs.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a wireless communication device in a wireless communication network is disclosed. The wireless communication device can include a transceiver, a memory, and a processor communicatively coupled to the transceiver and the memory. The processor and the memory can be configured to transmit a first sidelink-positioning reference signal (SL-PRS) resource reservation message within resources in a SL communication resource pool, where the first SL-PRS resource reservation message identifies a first SL-PRS resource within a SL-PRS resource pool, and the SL communication resource pool is different from the SL-PRS resource pool. The processor and the memory can be further configured to transmit a first SL-PRS in the first SL-PRS resource within the SL-PRS resource pool.

In another example, a method of wireless communication at a wireless communication device in a wireless communication network is disclosed. The method can include transmitting a first sidelink-positioning reference signal (SL-PRS) resource reservation message within resources in a SL communication resource pool, where the first SL-PRS resource reservation message identifies a first SL-PRS resource within a SL-PRS resource pool, and the SL communication resource pool is different from the SL-PRS resource pool. The method can further include transmitting a first SL-PRS in the first SL-PRS resource within the SL-PRS resource pool.

In a further example, a wireless communication device in a wireless communication network is disclosed. The wireless communication device can include a transceiver, a memory, and a processor communicatively coupled to the transceiver and the memory. The processor and the memory can be configured to utilize the transceiver to receive a first sidelink-positioning reference signal (SL-PRS) resource reservation message within resources in a SL communication resource pool, wherein the first SL-PRS resource reservation message identifies a first SL-PRS resource within a SL-PRS resource pool, and the SL communication resource pool is different from the SL-PRS resource pool. The processor and the memory can be further configured to receive a first SL-PRS in the first SL-PRS resource within the SL-PRS resource pool.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

DETAILED DESCRIPTION

Figure 1:
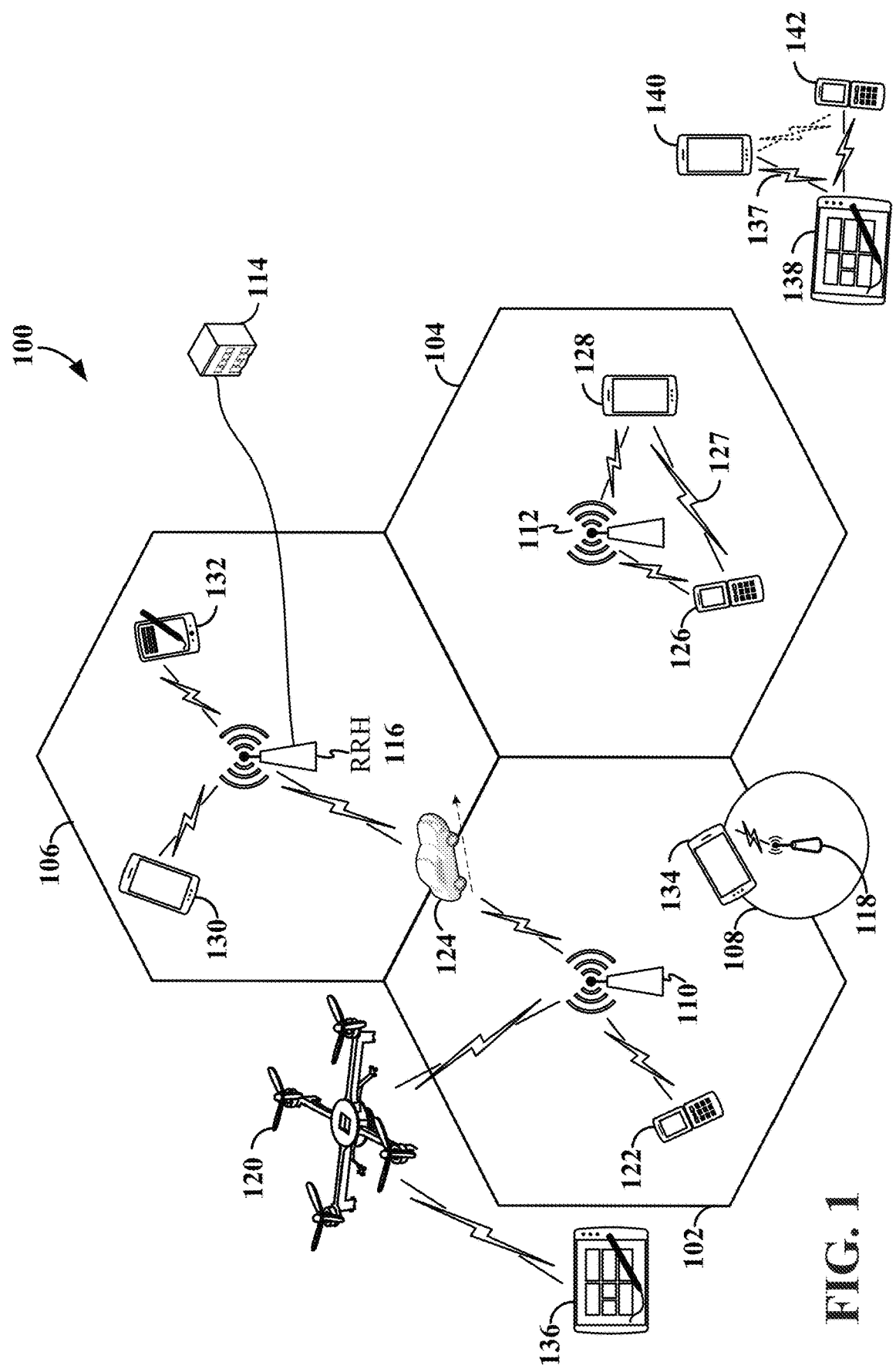
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to resource reservation techniques utilized to reserve resources for positioning signals for wireless communication devices (e.g., user equipment, sidelink devices). The positioning signals may be sidelink (SL) positioning reference signals (PRS). The resources may be located within a SL-PRS resource pool. The SL-PRS resource pool may be different from a SL communication resource pool. According to some aspects, the SL-PRS resource pool and the SL communication resource pool may be configured in two different bandwidth parts (BWPs). In one example, the SL-PRS resource pool may be configured in a first BWP with a first bandwidth, which may be different from a second bandwidth of a second BWP configured for the SL communication resource pool. According to one example, the first bandwidth (configured for the first BWP of the SL-PRS resource pool) may be larger than the second bandwidth (configured for the second BWP of the SL communication resource pool). The SL-PRS resource pool may be established to reserve a first pool of resources for SL-PRS signaling, while the SL communication resource pool may be established to reserve a second pool of resources for communication of at least one of sidelink data or sidelink control. Accuracy of positioning measurements using SL-PRSs increases with increasing bandwidth.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time—frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
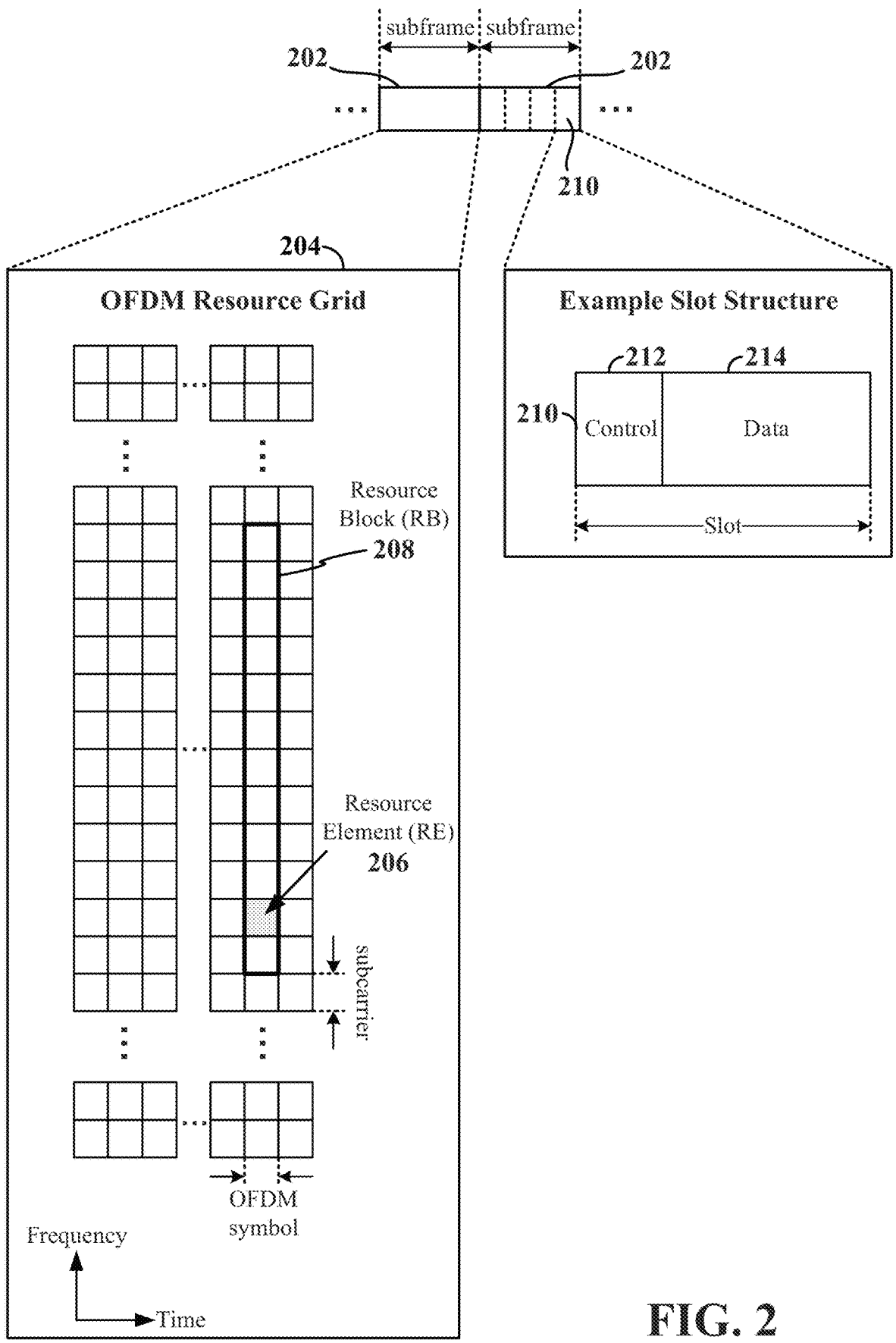
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time—frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier x 1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional example may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
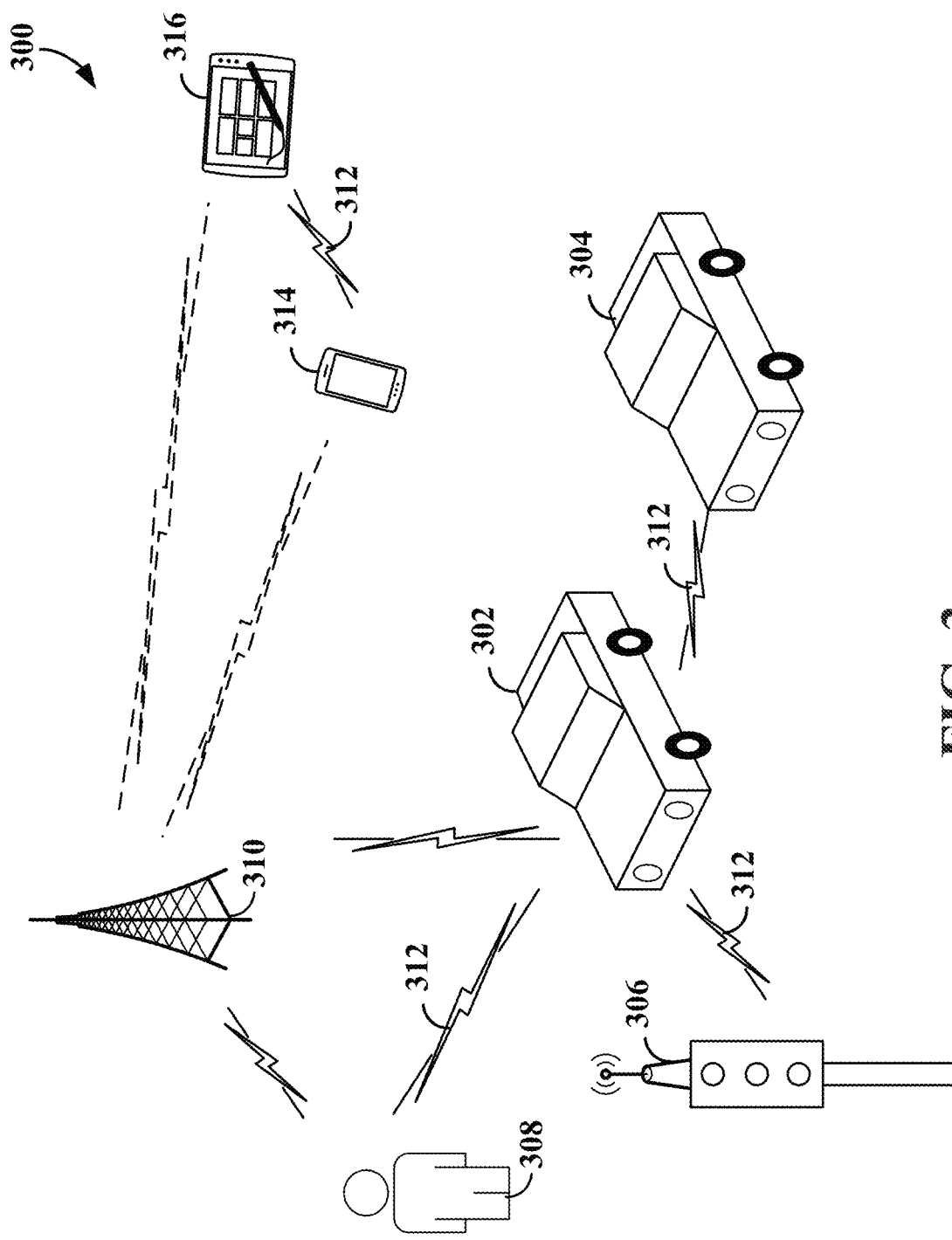
FIG. 3 is a diagram illustrating an example of a wireless communication network employing sidelink communication according to some aspects.

FIG. 3 is a diagram illustrating an example of a wireless communication network 300 employing sidelink communication according to some aspects. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving, and improve road safety, and improve traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. For example, the base station 310 may schedule the sidelink communication via DCI 3_0. In some examples, the base station 310 may schedule the PSCCH/PSSCH within uplink resources indicated in DCI 3_0. The base station 310 may further activate preconfigured sidelink grants (e.g., configured grants) for sidelink communication among the sidelink devices. In some examples, the base station 310 may activate a configured grant (CG) via RRC signaling. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). For example, SCI-1 may include a physical sidelink shared channel (PSSCH) resource assignment and a resource reservation period (if enabled). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK (e.g., for groupcast option 1 supporting NACK-only signaling). SCI-2 may include other information that is useful for establishing and decoding a PSSCH resource.

Figure 4A:
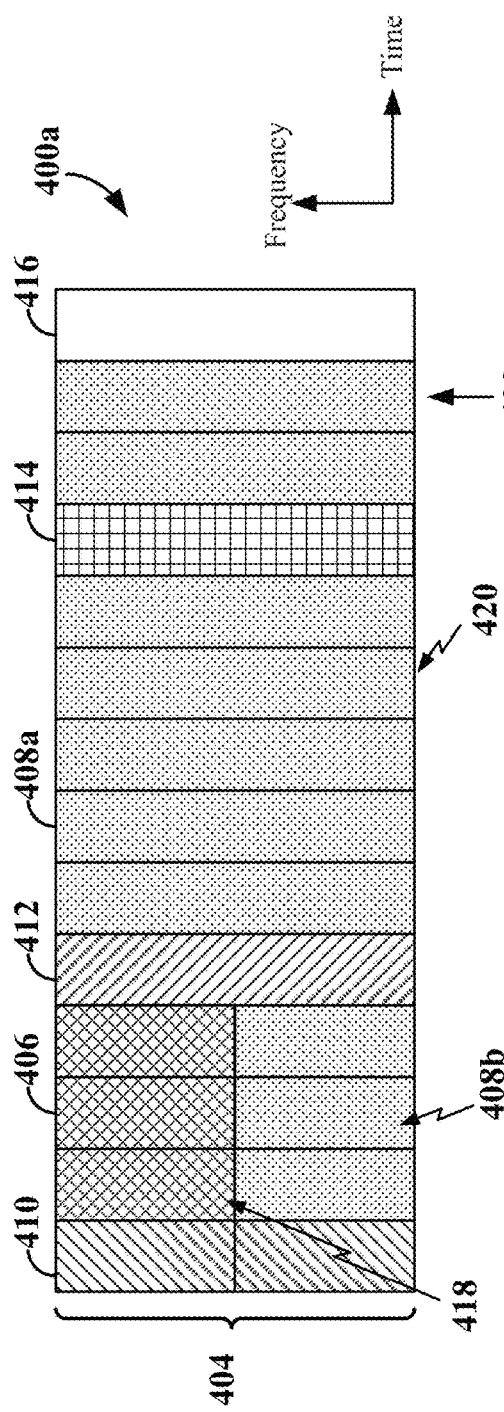
FIGS. 4A and 4B are diagrams illustrating examples of sidelink slot structures according to some aspects.
Figure 4B:
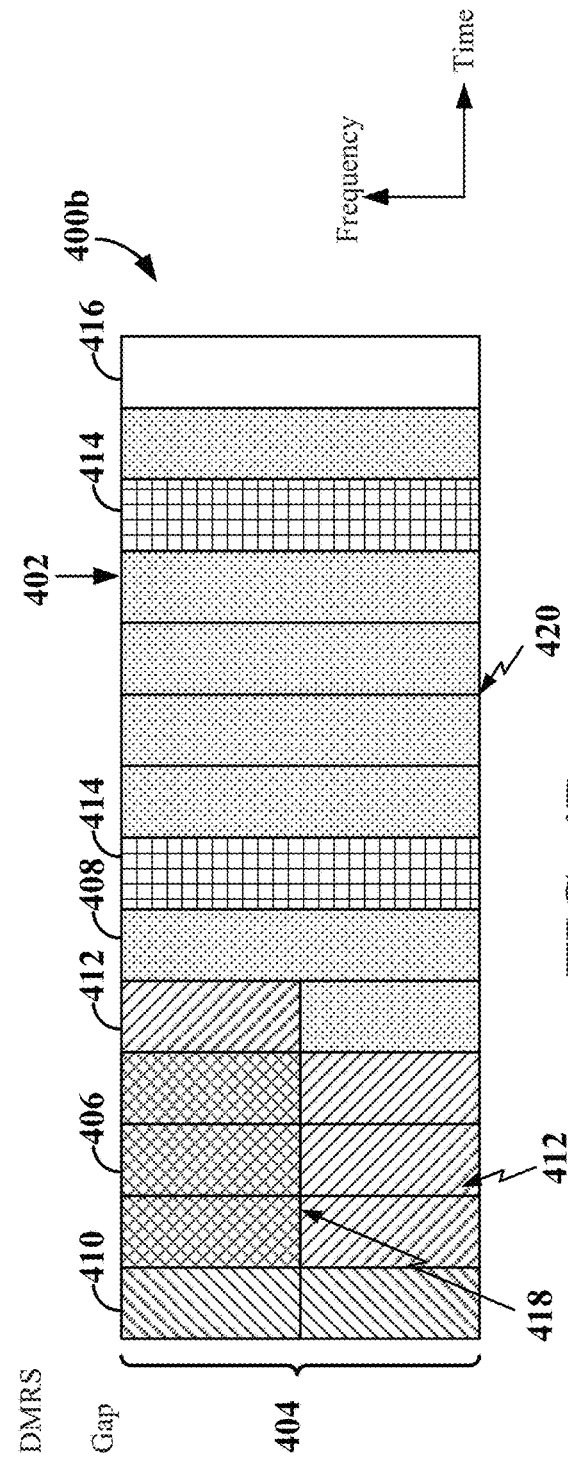

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 14, 20, 24, 40, 44, or 100 PRBs).

FIGS. 4A and 4B are diagrams illustrating examples of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 that schedules transmission of data traffic on time—frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSSCH resource size may be fixed for a resource pool (e.g., 10% to 100% of one sub-channel in the first two or three symbols). For example, the PSCCH 406 may occupy 10, 12, 15, 20, or 25 RBs of a single sub-channel. A DMRS may further be present in every PSCCH symbol. In some examples, the DMRS may be placed on every fourth RE of the PSCCH 406. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 4A and 4B, the starting symbol for the PSCCH 406 is the second symbol of the corresponding slot 400a or 400b and the PSCCH 406 spans three symbols 402.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408a that is TDMed with the PSCCH 406 and a second portion 408b that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 256-QAM). In addition, the PSSCH 408 may include DMRSs 414 configured in a two, three, or four symbol DMRS pattern. For example, slot 400a shown in FIG. 4A illustrates a two symbol DMRS pattern, while slot 400b shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In addition, a gap symbol 416 is present after the PSSCH 408 in each slot 400a and 400b.

Each slot 400a and 400b further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the PSSCH 408 may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Within a sidelink communication network, such as a V2X network, determinations of the position (referred to herein as positioning) of UEs may enhance or support various features, such as navigation, autonomous driving, and cooperative safety. Positioning of UEs may be accomplished, for example, using a global navigation satellite system (GNSS) receiver within the UE and/or via sidelink-based ranging (positioning) between UEs. For example, UEs may exchange positioning reference signals (PRSs) over sidelinks to determine the relative distance between the UEs and/or the absolute position (e.g., geographical coordinates) of the UEs. Sidelink-based positioning may be used in lieu of or may enhance the ranging and position accuracy of GNSS-based positioning.

If a wireless communication device is configured with GNSS hardware and software, the wireless communication device may be able to determine its geographic location (e.g., its absolute location) when the wireless communication device has line-of-sight with at least four GNSS satellites. Three of the satellites may be used to determine a position on the Earth, and the fourth satellite may be used to adjust for any errors in the clock of the wireless communication device. However, there may be instances where a wireless communication device is not GNSS capable (e.g., does not include GNSS hardware and/or software), where a wireless communication device is GNSS capable but cannot receive signals from four (or even three) GNSS satellites, or where the accuracy of a GNSS obtained location is insufficient (for example, in some V2X use cases involving autonomous driving and vehicle and pedestrian safety). Situations in which the wireless communication device may be unable to receive signals from four (or even three) GNSS satellites include, but are not limited to, those instances where a GNSS capable wireless communication device is in a city with tall buildings (for example, where the buildings attenuate the GNSS signals or reflect the GNSS signals), inside a building, inside a tunnel, and/or underground (for example in an underground parking structure).

Regardless of whether the wireless communication device can obtain its absolute location from use of the GNSS, the wireless communication device may be able to locate its relative position by determining its distance from two or more other wireless communication devices. Such relative position location by distance determination may be referred to as relative positioning or ranging. Determinations of location by relative positioning or ranging may be based, for example, on measurements of round trip time (RTT) of SL-PRS signals. For example, RTT location determination may be based on a calculation of an inter-UE RTT between a first UE and a second UE, where a calculation at the second UE (e.g., the UE receiving a SL-PRS from the first UE) determines a difference between a known transmit time of the SL-PRS from the first UE and a measured receive time of that SL-PRS at the second UE. The second UE calculates the RTT and provides the RTT to the first UE in a positioning information (PI) message sent from the second UE to the first UE. The PI may also include other respective RTTs representative of distances between the second UE and other respective UEs participating in RTT positioning determinations with the first UE and the second UE. Positioning, utilizing RTT or other such practices may therefore be performed based on various measurements of the SL-PRSs transmitted and received among at least two wireless communication devices.

In some examples, one or more of the wireless communication devices may be a roadside unit (RSU) where an absolute location of the RSU is known. In such an example, measurement of the relative distance between a first wireless communication device and at least one other wireless communication device including the RSU may be used to determine an absolute location of the first wireless communication device with greater accuracy than that given by a GNSS determined location. Even if a location of a second wireless communication device (like an RSU) is not known, an ability to measure the relative distance (the range) between two wireless communication devices with accuracy may be important. For example, in the cases of two vehicles traveling in one lane through a tunnel (where GNSS cannot be used) or on a highway (where GNSS may be available), knowledge of an accurately measured relative distance between the two vehicles (apart from knowledge of the absolute position of each vehicle) may inform the following vehicle of a need to increase the relative distance between the leading vehicle and the following vehicle. Some V2X applications, like that given in the preceding example, may have a high accuracy requirement; for example, sub-meter level accuracy may be used to support vehicle maneuvering coordination. Some applications (including V2X and/or commercial applications) may have less of an accuracy requirement (e.g., non-safety-related applications). In general, the position accuracy determined, for example, by RTT type measurements may be a function of the SL-PRS bandwidth. As SL-PRS bandwidth increases, positioning accuracy increases.

SL-PRS transmissions in various spectrum types may likely be supported in the future. For example, SL-PRS may be transmitted in unlicensed spectrum where a large bandwidth may be available (e.g., Unlicensed National Information Infrastructure (U-NII) UN-II-5 with an available bandwidth of 500 MHz or U-NII-3 with an available bandwidth of 125 MHz). SL-PRS may also be transmitted in licensed/intelligent transport system (ITS) spectrum when, for example, bandwidth larger than that presently allotted for V2X/ITS becomes available or when accuracy requirements do not necessitate large bandwidths. However, relatively large bandwidths of resources are presently available for sidelink communication between UEs. The presently available resources may be reserved for use in SL communication resource pools.

Various aspects of the disclosure relate to techniques for reserving resources in resource pools dedicated for SL-PRS signaling (referred to herein as SL-PRS resource pools). According to some aspects, a SL-PRS resource reservation message may be included in messaging carried in a PSSCH. The SL-PRS resource pools may be different from the SL communication resource pools. Examples described herein may enable the use of SL-PRS resource pools in ways that may minimize impact to legacy V2X/sidelink operations.

Figure 5:
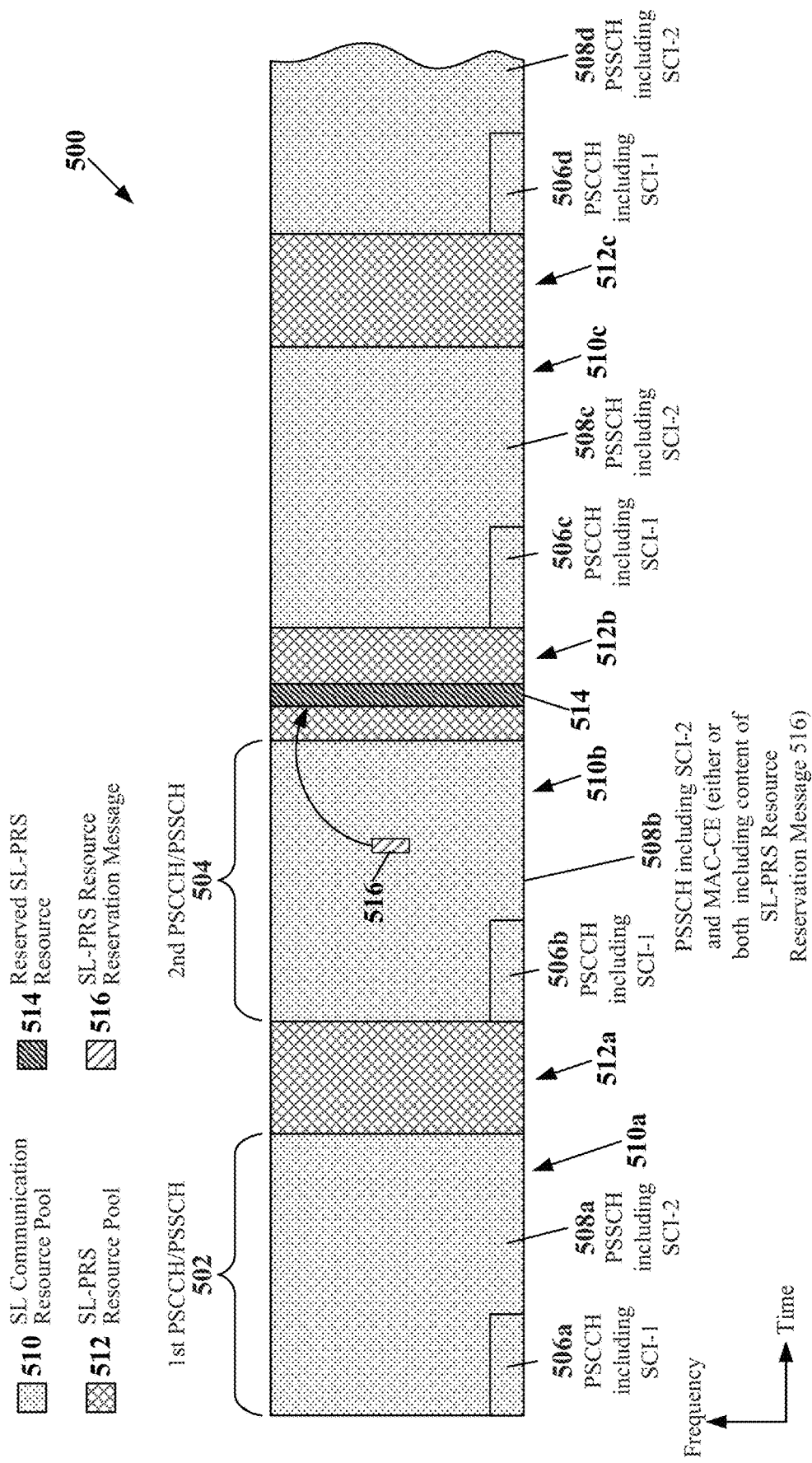
FIG. 5 is a diagram illustrating an example of a plurality of sidelink communication resource pools and sidelink-positioning reference signal (SL-PRS) resource pools according to some aspects.

FIG. 5 is a diagram 500 illustrating an example of a plurality of sidelink communication resource pools 510a, 510b, 510c (hereinafter SL communication resource pools) and SL-PRS resource pools 512a, 512b, 512c according to some aspects. In the example shown in FIG. 5, time is illustrated along the horizontal axis, while frequency is illustrated along the vertical axis. A first PSCCH/PSSCH transmission 502 and a second PSCCH/PSSCH transmission 504 are identified for reference. Each of the PSCCH/PSSCH transmissions include a PSCCH 506a, 506b, 506c, 506d and a PSSCH 508a, 508b, 508c, 508d. Data is organized into transport blocks (TBs), and each TB is associated with a SCI. The SCI is transmitted in two stages. The 1st-stage SCI (SCI-1) is carried on the PSCCH 506a, 506b, 506c, 506d, while the 2nd-stage SCI (SCI-2) and associated TB is carried on the respective PSSCH 508a, 508b, 508c, 508d.

The PSCCH 506a, 506b, 506c, 506d carries the SCI-1. The SCI-1 indicates resource allocation, modulation and coding scheme (MCS), and priority of the associated PSSCH. The SCI-1 also indicates a resource reservation period, a time pattern, a number of ports for PSSCH DMRS, and a size and format of the SCI-2. In some examples, sidelink UE operation under mode 2 is contemplated. In mode 2, each UE schedules its own transmissions without reliance on the network for scheduling. For example, in mode 2, resource allocation may be based on sidelink sensing, which includes SCI decoding and reference signal received power (RSRP) measurement. If a future resource is indicated as being reserved by a decoded SCI-1 of a first UE and, the RSRP measured in the SCI-1 by a second UE is higher than an RSRP threshold, the future resource may be considered as being reserved, and therefore unavailable for use by the second UE; otherwise, the future resource may be considered as available. Accordingly, a sidelink UE may transmit a first transmission of a SL communication in resources of the SL communication resource pool 510a if the resources are available. In the first transmission, the SCI-1 of the first PSCCH (e.g., PSCCH 506a) reserves resources (e.g., of the SL communication resource pool(s) 510b, 510c) for one or more subsequent transmissions. The reservation may be made based, for example, on a resource reservation period indicated in the SCI-1. All UEs may decode the respective SCI-1s transmitted by a plurality of respective UEs. Decoding the SCI-1s permits a UE to avoid transmitting on resources that another UE reserves. Accordingly, a first UE receiving a plurality of SCI-1s from a respective plurality of other UEs may determine a set of resources in the SL communication resource pool 510 that are not available to the first UE (because the unavailable resources in the set of resources have already been reserved for use by other UEs).

The first transmission in the SL communication resources further includes the PSSCH (e.g., PSSCH 508a) that carries the TB and the SCI-2. Subsequent transmissions may further include additional SCI-1/PSCCHs (e.g., 506b, 506c, and 506d), and additional PSSCHs (e.g., 508b, 508c, and 508d) carrying additional TBs and additional SCI-2s.

For mode 2 transmissions, the physical layer control signaling (e.g., SCI-1) may enable the avoidance of collisions in SL communication resources that are identified as being reserved in an initially transmitted SCI-1 (e.g., the SCI-1 indicates a resource allocation and a resource reservation period). However, physical layer control signaling directed to SL-PRS operations (as opposed to sidelink communication operations) is not currently defined. Therefore, in mode 2, where the network does not participate in scheduling transmissions of any type, some form of transmission coordination between sidelink UEs employing sidelink positioning may be needed. Accordingly, messaging related to sidelink positioning, which may not necessitate changes to an existing SCI-1 format may be useful.

According to aspects described herein, a sidelink UE may reserve, ahead of its first transmission in resources within a SL-PRS resource pool 512b, a subset 514 of the resources within the SL-PRS resource pool 512b for a first transmission of a SL-PRS. To reserve the SL-PRS resources for the initial transmission of the SL-PRS, and to aid in the coordination of transmissions of SL-PRS among sidelink UEs, a message sent from resources within the SL communication resource pool 510b that reserves the subset 514 of resources within the SL-PRS resource pool 512b may be introduced. The message may be referred to herein as a SL-PRS resource reservation message 516.

The SL communication resource pool 510, which includes resources that may be reserved for SL communications, is distinct from the SL-PRS resource pool 512, which includes resources that may be reserved to carry SL-PRSs. The resources dedicated for the SL communication resource pool 510a, 510b, 510c and the resources dedicated for the SL-PRS resource pool 512a, 512b, 512c may be configured by a network, predefined, or otherwise reserved for use as the SL communication resource pool 510a, 510b, 510c and the SL-PRS resource pool 512a, 512b, 512c, respectively.

According to one aspect, the SL-PRS resource reservation message 516 may include data related to SL-PRS operation/configuration. The SL-PRS resource reservation message 516 (or the data related to SL-PRS operation/configuration therein) may be included with other data that may be directed to other operations/configurations. For example, according to one aspect, a reference to the SL-PRS resource reservation message 516 made herein may be understood as being a reference to a SCI-2 having a format that includes the data of the SL-PRS resource reservation message 516. According to another aspect, the SL-PRS resource reservation message 516 may be a distinct message that includes data related to SL-PRS operation/configuration without other data that may be directed to other operations/configurations. For example, according to one aspect, a reference to the SL-PRS resource reservation message 516 made herein may be understood as being a reference to a MAC control element (MAC CE), included in the transport block carried by the PSSCH 508b, formatted to carry the data of the SL-PRS resource reservation message 516. Other types of messages, which may be utilized to convey data associated with SL-PRS operation/configuration are within the scope of the disclosure. The position of the object identified as the SL-PRS resource reservation message 516 within the SL communication resource pool 510b, and the shape of the object identified as the SL-PRS resource reservation message 516 within the SL communication resource pool 510b are for explanatory and non-limiting purposes.

In general, the data associated with the SL-PRS resource reservation message 516 may be included in a SCI-2, a MAC CE, or some other data conveying feature carried within resources in the SL communication resource pool 510, and may be used by a first sidelink UE to indicate to other sidelink UEs, before a transmission of a SL-PRS, that the subset 514 of the resources within the SL-PRS resource pool 512b is being reserved for the transmission of the SL-PRS. Because the SL-PRS resource reservation message 516 (indicating the subset 514 of resources within the SL-PRS resource pool 512b reserved for the transmission of the SL-PRS) is transmitted within resources in the SL communication resource pool 510b, this type of resource reservation may be referred to as a cross-pool resource reservation. The (cross-pool) reservation of the resources for a transmission of a SL-PRS (e.g., the cross-pool resource reservation made by the SL-PRS resource reservation message 516) from resources within the SL communication resource pool 510b is different than a same-pool reservation (e.g., the reservation carried by the SCI-1 in the PSCCH 506a of resources in the PSSCH 508a, where the reservation carried by the SCI-1 in the PSCCH 506a and the reserved resources in the PSSCH 508a are carried in the same SL communication resource pool 510a). Utilizing, for example, the SCI-2 and/or a MAC CE in the transport block carried by the PSSCH 508b in the SL communication resource pool 510b to indicate the reserved sidelink resources within the SL-PRS resource pool 512b, instead of utilizing a SCI-1, may avoid any need for modifying the SCI-1 format and thereby avoid impact to legacy UEs.

In the example of FIG. 5, the SL-PRS resource pool 512a adjacent to the SL communication resource pool 510a has been configured by the network but has not been used (or reserved for use) by any UE for a transmission of a SL-PRS. In contrast, a designated subset 514 of the resources within the SL-PRS resource pool 512b adjacent to the SL communication resource pool 510b have been reserved by a given UE for a transmission of a SL-PRS.

The transmission of the SL-PRS resource reservation message 516 may facilitate the coordination of SL-PRS transmissions among a plurality of sidelink UEs. According to some aspects, the transmitting (Tx) UE may select the subset 514 of resources within the SL-PRS resource pool 512b based on the identification of available SL-PRS resources within the SL-PRS resource pool 512b. Identifying the available resources may be achieved by listening to (e.g., decoding of) SL-PRS resource reservation messages (not shown) of other sidelink UEs and selecting the subset 514 of resources within the SL-PRS resource pool 512b that have not been reserved for SL-PRS transmissions by the other sidelink UEs. Accordingly, coordinated transmissions of SL-PRSs among a plurality of sidelink UEs may be performed without a need to measure the RSRP of the reservation signal (e.g., measure RSRP of reference signal associated with PSCCH transmission, where the PSCCH carries the SCI-1) and without a need for changes (e.g., to support SL-PRS resource reservation) to the SCI-1. For example, according to one aspect (related to SL-PRS resource reservation message decoding only), if a SL-PRS resource (e.g., the subset 514 of resources) within the SL-PRS resource pool (e.g., SL-PRS resource pool 512b) was indicated as being reserved by a decoded SL-PRS resource reservation message (e.g., SL-PRS resource reservation message 516) transmitted by a first UE (not shown), the SL-PRS resource (e.g., the subset 514 of resources) may be considered as unavailable to other UEs (not shown) that decoded the SL-PRS resource reservation message transmitted by the first UE. In other words, the SL-PRS resource may be available if no decoded SL-PRS resource reservation message reserving the SL-PRS resource is received. According to another aspect (related to SL-PRS resource reservation message decoding and RSRP measurement), an SL-PRS resource may be considered as available if no decoded SL-PRS resource reservation message reserving the SL-PRS resource is received, or a decoded SL-PRS resource reservation message reserving the SL-PRS resource is received, but the RSRP measured in that SL-PRS resource reservation message was below an RSRP threshold. Accordingly, aspects described herein may provide a reservation-based SL-PRS transmission framework employing a dedicated SL-PRS resource pool to coordinate SL-PRS transmissions among a plurality of sidelink UEs.

According to aspects described herein, SL-PRS transmission (e.g., initial SL-PRS transmission) may be reservation-based. To the extent that present SL communications may be thought of as reservation-based, only the subsequent transmissions of SL communications are based on a reservation made in an initially transmitted SCI-1. The initial transmission of a SL communication, including a first transmitted SCI-1 (made in a first PSCCH), may be based on energy sensing, not on resource reservation. Accordingly, the SL-PRS resource reservation messaging described herein may alternatively be described as a pre-reservation-based methodology.

When transmitting the SL-PRS in resources within the SL-PRS resource pool, the SL-PRS may be sent as a standalone signal, i.e., there is no accompanying signal (like a control signal in a control channel) sent together with the SL-PRS. In contrast, when transmitting a sidelink communication in a PSSCH in the SL communication resource pool, an accompanying control signal (a SCI-1 in a PSCCH) may be sent together with the PSSCH. That is, each PSSCH may be accompanied by a PSCCH (carrying a control signal (SCI-1) associated with the PSSCH); however, no control signal may accompany a transmission of a SL-PRS.

To transmit a SL-PRS, the Tx UE first reserves resources, for the SL-PRS transmission, within resources of a dedicated SL-PRS resource pool 512. The message reserving the resources (referred to herein as a SL-PRS resource reservation message 516) may be sent within resources of a SL communication resource pool 510. The reservation may be based on identifying the available SL-PRS resources within the SL-PRS resource pool 512. However, those of skill in the art will recognize that some or all of the available SL-PRS resources may be utilized in a pre-emption scenario, where, for example, the available SL-PRS resources may be preempted for use by a process/message that has a higher priority than the priority associated with a SL-PRS transmission.

According to some aspects, the SL-PRS resource reservation message 516 may be sent by a first UE (e.g., reserving UE) for a second UE (e.g., a Tx UE transmitting the SL-PRS). That is, a reserving UE sending a SL-PRS resource reservation message may reserve a SL-PRS resource for another UE's (e.g., Tx UE) SL-PRS transmission. For example, this aspect may find utility when an RTT type distance measurement (ranging) operation is conducted with multiple SL-PRS transmissions from multiple UEs. In the RTT type ranging scenario, multiple UEs may take turns transmitting SL-PRSs. The multiple UEs may form a group for SL-PRS transmissions.

In such a scenario, a first UE may know a transmit time of an SL-PRS from the first UE. The first UE may receive positioning information (PI) from other UEs, where each respective PI reports a time that a given UE received the SL-PRS transmitted from the first UE (among other things). The first UE may calculate a RTT between the first UE and the respective PI report generating UE. The distance (range) between the first UE and the PI report generating UE may be determined based on the calculated RTT.

To determine a time of transmission and a time of reception of SL-PRSs, each UE may use a respective reference oscillator to generate a respective reference frequency. The reference frequency may be used by each respective UE to synchronize one or more internal clocks and/or to synchronize the internal clocks of one UE to a second UE, for example. The reference oscillators used may be of such quality that the reference frequency of each reference oscillator may drift over time. Therefore, it may be beneficial to trigger all SL-PRS transmissions for an RTT type ranging measurement at the same or substantially the same time (so that the time between respective SL-PRS transmissions is short and the respective reference oscillators generating respective reference frequencies have minimum time to drift in frequency). If there is no drift, even if the reference oscillators of two UEs are not synchronized, then the timing difference between the two UEs can be canceled in the RTT type ranging measurement. However, if the reference oscillator of one UE is given time to drift, its drift cannot be canceled. Therefore, for at least this RTT type ranging measurement scenario, SL-PRS transmissions from one or more Tx UEs may be configured as close as possible in time.

Figure 8A:
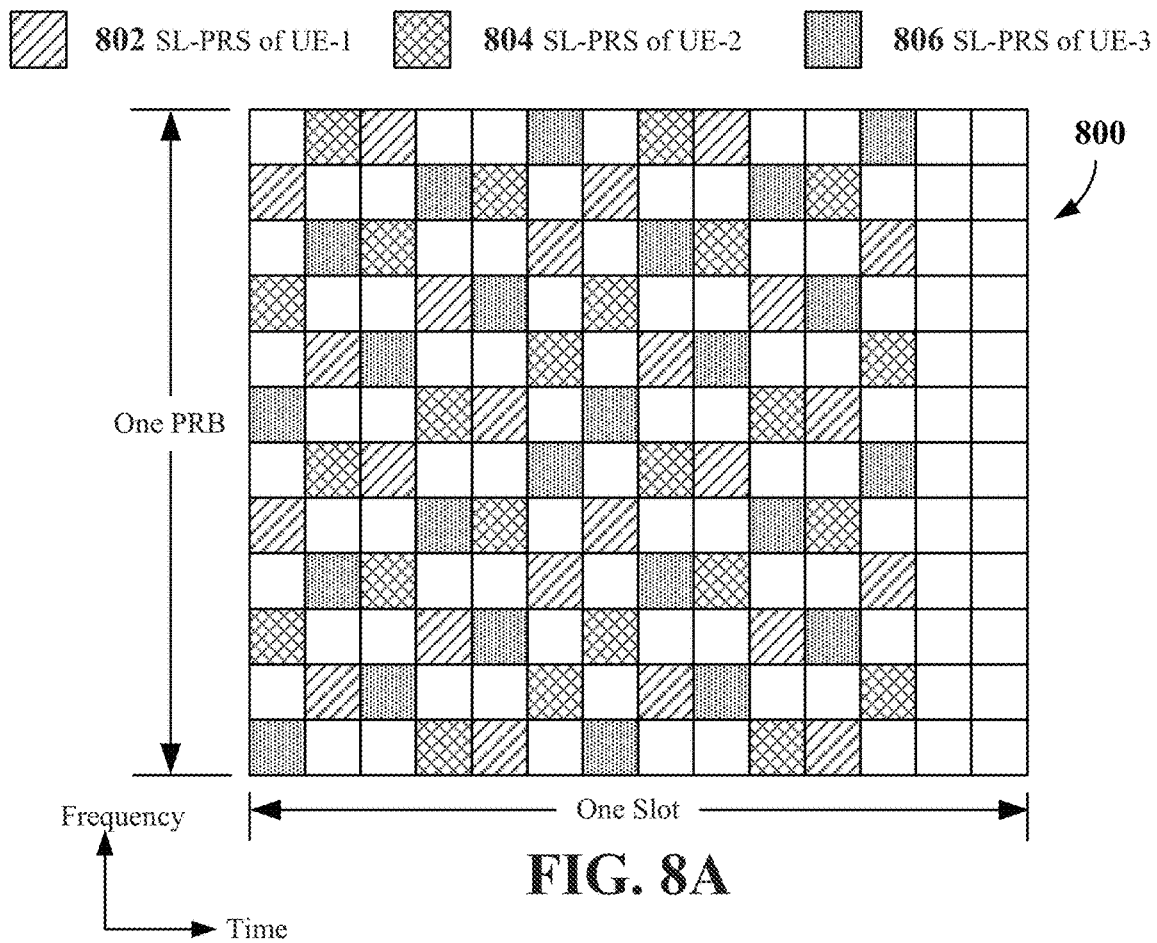
FIG. 8A is a portion of a resource grid providing an example of a comb-6 type resource allocation for the SL-PRSs of three UEs according to aspects described herein.

In a first example, a first UE may reserve resources (i.e., frequency-time resources within a SL-PRS resource pool) for one or more other UEs. The frequency-time resources may be scheduled using frequency division multiplexing (FDM), such that the respective SL-PRSs transmitted by the respective one or more other UEs are multiplexed in the frequency domain within the same symbol(s) in the time domain FIG. 8A depicts such an example. Accordingly, the one or more UEs may transmit their respective SL-PRSs without interference by transmitting the respective SL-PRSs at a same time using separate subcarriers. In this example, the first UE may not schedule resources for transmission of its SL-PRS at the same time as the resources used to schedule the transmissions of the respective SL-PRSs of the one or more other UEs. In this manner, the first UE may receive the one or more respective SL-PRSs from the one or more other UEs at the time when the respective one or more other UEs transmit their respective SL-PRSs. Thus, according to this first example, the first UE may reserve resources within the SL-PRS resource pool for one or more other UEs and trigger all SL-PRS transmissions of the one or more other UEs at the same time (by using FDM on a per symbol basis).

Figure 8B:
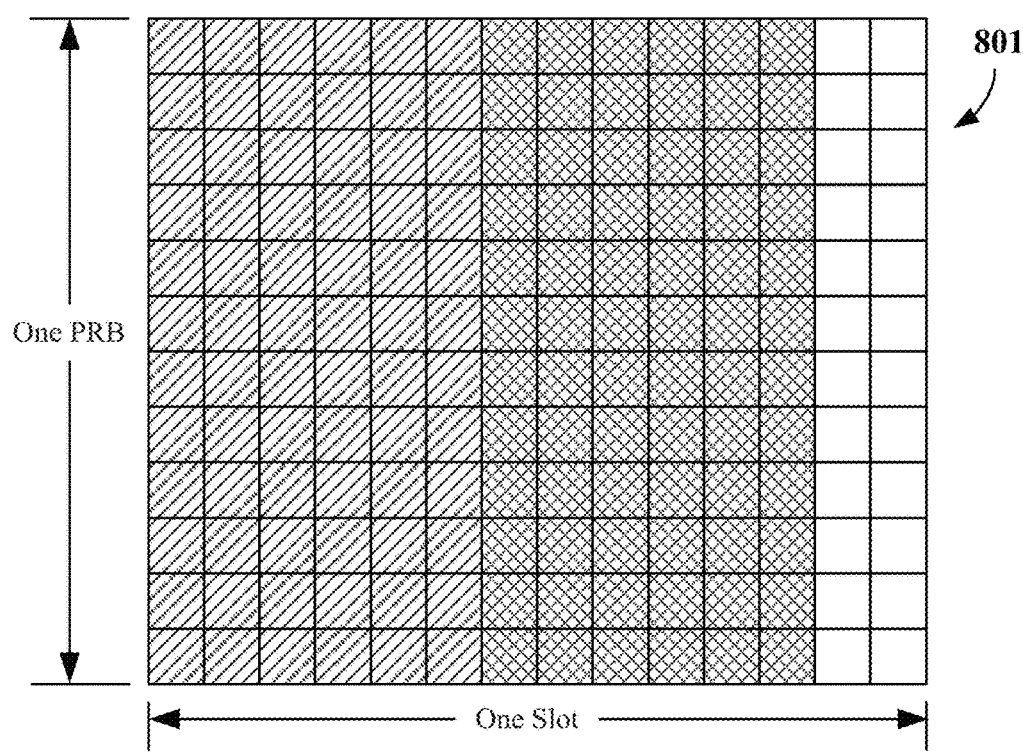
FIG. 8B is a portion of a resource grid providing an example of a back-to-back time domain resource allocation for SL-PRSs of two UEs according to aspects described herein.

In a second example, a first UE may reserve resources (i.e., frequency-time resources within a SL-PRS resource pool) for itself and a second UE. FIG. 8B depicts such an example. The frequency-time resources may be scheduled such that the first UE and the second UE transmit their respective SL-PRSs in the same slot at different times. For example, the first UE may reserve resources within the SL-PRS resource pool in one slot for both itself and the second UE. In the frequency domain, the resources assigned to the respective UEs may span the entire bandwidth of the SL-PRS resource pool, or a sub-band thereof. The bandwidth of the respective resources of the first and second UE may be the same or different. In the time domain, the first UE may assign a first half of the OFDM symbols in the slot to itself, and a second half of the OFDM symbols in the slot to the second UE. Accordingly, the SL-PRS transmission of the first UE occurs in the first half (in the time domain) of the slot and the SL-PRS transmission of the second UE occurs in the second half (in the time domain) of the slot, immediately following the SL-PRS transmission of the first UE. Thus, according to this second example, the first UE may reserve resources within the SL-PRS resource pool for itself and a second UE and trigger the respective SL-PRS transmissions at substantially the same time (e.g., back-to-back within one slot). The first and second examples provided above are illustrative and non-limiting. For example, in the second example, the division of time domain resource assigned in a given slot (for transmission of respective SL-PRS of the respective UEs) may be equal or unequal and the time domain resource assigned in the given slot may be contiguous or not contiguous.

Furthermore, the aspect of a first UE reserving resources (time-frequency resources) for itself and/or one or more other UEs may reduce the signaling overhead for at least some of the one or more other UEs, as not every UE may need to send its own SL-PRS resource reservation message 516. According to this aspect, a reserving UE may send a SL-PRS resource reservation message reserving SL-PRS resources for itself and at least one other UE. The assignment of the reserved SL-PRS resources may be indicated in the SL-PRS resource reservation message 516 sent by the reserving UE, or it may be determined based on a predetermined rule. For example, in the second example provided above, when the reserving UE makes a SL-PRS resource reservation for itself and a peer UE, by default, the first half of the reserved SL-PRS resource (i.e., the first half of the reserved SL-PRS resource in the time domain) may be used for the reserving UE's SL-PRS transmission, while the remaining half of the SL-PRS resource (i.e., of the reserved SL-PRS resource in the time domain) is used for its peer UE's SL-PRS transmission.

Figure 6:
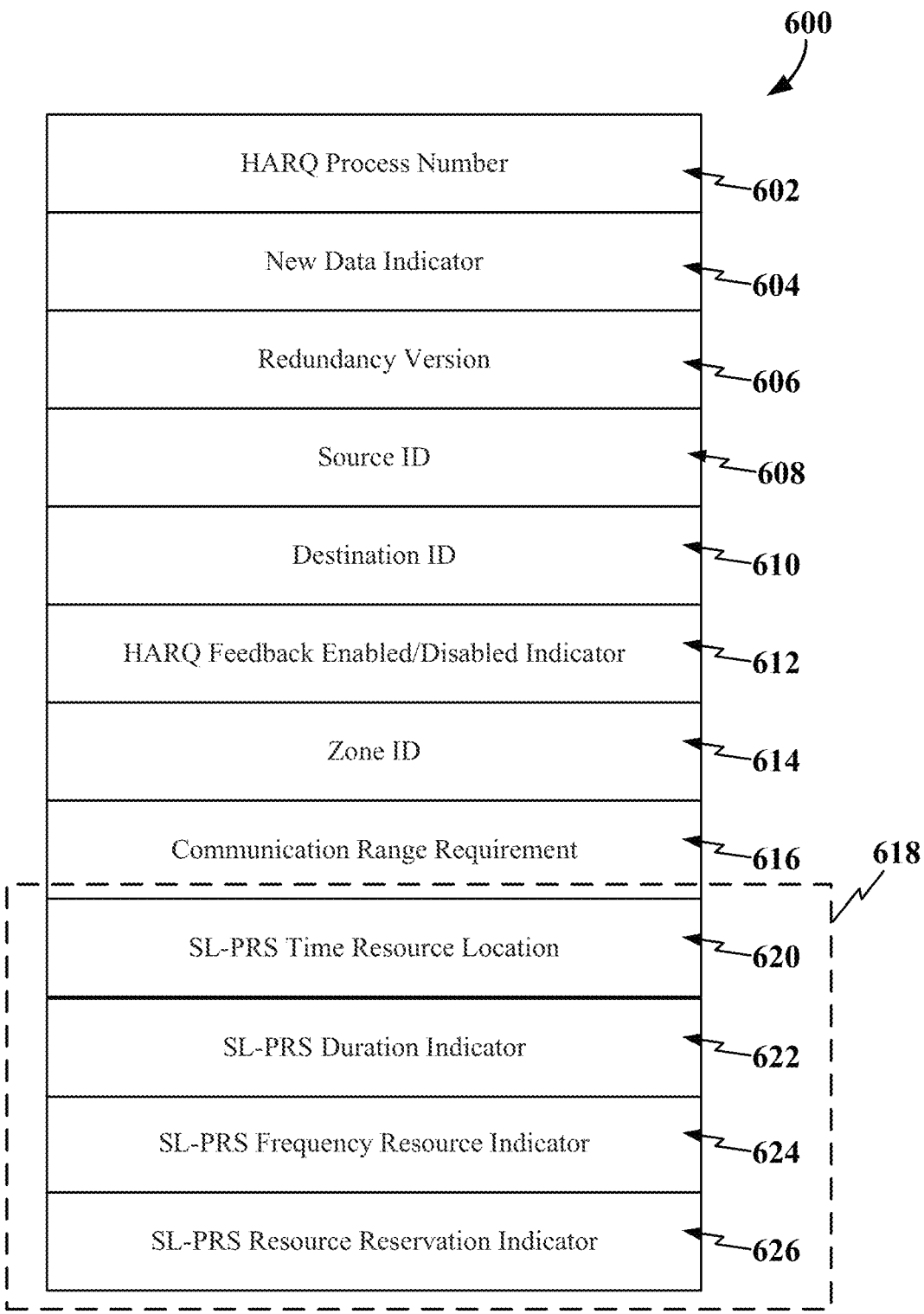
FIG. 6 is a diagram illustrating an example of a sidelink control information-second stage format configured for SL-PRS processes, according to some aspects.

FIG. 6 is a diagram illustrating an example of a sidelink control information-second stage (SCI-2) format 600, configured for SL-PRS processes, according to some aspects. According to one example, the parameters of the SL-PRS resource reservation message (similar to SL-PRS resource reservation message 516 as shown and described in connection with FIG. 5) may be conveyed as PHY control signaling, for example, in a modified SCI-2 message (e.g., a new SCI-2 format may be provided). The SCI-2 format 600 may include parameters associated with reference number 618. By conveying the SL-PRS resource reservation message parameters at the PHY layer, the Rx UEs can process the information at the PHY layer, thereby eliminating the time and power used to process the information at higher layers.

In some examples, the SCI-2 format 600 may be a modified SCI Format 2-B, which may be used to decode PSSCH, with HARQ operation when HARQ-ACK information includes only NACK or when there is no feedback of HARQ-ACK information. SCI Format 2-A or other suitable SCI formats may also be utilized as a SCI-2 modified for SL-PRS processes without departing from the scope of the disclosure. The SCI-2 format 600 includes a plurality of fields. For example, the SCI-2 format 600 may include a HARQ process number 602 that identifies a HARQ process associated with the SCI-2, a new data indicator 604 that indicates whether the data associated with the SCI-2 is new or retransmitted data, a redundancy version 606, a source ID 608 identifying the source of the transmission, and a destination ID 610 identifying the destination of the transmission. For example, the destination ID 610 may include a single destination ID associated with a single other participating UE for unicast SCI-2, a plurality of destination IDs (e.g., destination Layer 2 IDs) for unicast SCI-2, each associated with one of a plurality of participating UEs, a group ID (e.g., group destination Layer 2 ID) identifying a group of participating UEs for groupcast SCI-2, or a broadcast ID (e.g., broadcast destination Layer 2 ID) for a broadcast SCI-2. The SCI-2 format 600 may also include a HARQ feedback enabled/disabled indicator 612, a zone ID 612 identifying a geographic zone within which the TX UE is located, and a communication range requirement 614 indicating a range within which the communication related to the SCI-2 is pertinent.

The SCI-2 format 600 may also include a SL-PRS time resource location 620. The SL-PRS time resource location 620 may be a parameter used to indicate the SL-PRS time resource location within the SL-PRS resource pool (similar to the SL-PRS resource pool 512 shown and described in connection with FIG. 5). According to one example, the SL-PRS time resource location 620 may be given as an offset value from a starting symbol or starting PRB of the SL-PRS resource pool. According to another example, the SL-PRS time resource location 620 may be given as an offset value from the transmission of the SL-PRS resource reservation message (similar to SL-PRS resource reservation message 516 as shown and described in connection with FIG. 5), which reserves the SL-PRS resource(s) for transmission of the SL-PRS(s). According to another example, the SL-PRS time resource location 620 may be given explicitly as a frame/slot/symbol index indication.

According to some aspects, the duration of a SL-PRS transmission may be pre-determined/pre-configured. However, the SCI-2 format 600 may also include a SL-PRS duration indicator 622. The SL-PRS duration indicator 622 may be a parameter that indicates a duration of a given SL-PRS (e.g., where the duration may be given in the number of OFDM symbols used by the SL-PRS). By way of example and not limitation, in one example, a SL-PRS may be predetermined/pre-configured to last 13 OFDM symbols, or a Tx UE may determine the SL-PRS duration and indicate that duration using the SL-PRS duration indicator 622 in the SCI-2 format 600.

The SCI-2 format 600 may also include a SL-PRS frequency resource indicator 624. The SL-PRS frequency resource indicator 624 may be a parameter indicating whether the SL-PRS occupies an entire frequency resource of the SL-PRS resource pool or a portion thereof. For example, a default for the SL-PRS frequency resource indicator 624 may correspond to the SL-PRS occupying the entire frequency resource of the SL-PRS resource pool. However, the SL-PRS frequency resource indicator 624 may also be used to indicate that the SL-PRS may be a sub-band signal transmission, and the SL-PRS frequency resource indicator 624 may indicate, for example, a frequency start and stop subchannel for the frequency resource component of one or more transmitted SL-PRS(s). According to other examples, the SL-PRS frequency resource indicator 624 may indicate that a SL-PRS may be mapped to a SL-PRS resource in a comb pattern. For example, a UE may map a given SL-PRS to every other resource element in the frequency domain (e.g., a comb-2 type pattern) or every sixth resource element in the frequency domain (e.g., a comb-6 type pattern). The preceding examples are for illustration and not limitation. For example, when the SL-PRS mapping is comb-based, the Tx UE may also utilize the SL-PRS frequency resource indicator 624 (or some other indicator) to indicate a comb index or comb offset. In still a further example, the SL-PRS frequency resource indicator 624 (or some other indicator) may be used to indicate a frequency pattern for transmission of SL-PRS(s). Accordingly, for example, the index of a comb may be flexible (for example, each frequency pattern may correspond to a different comb index). Utilizing this aspect, the frequency-division multiplexing (FDMing) of different SL-PRSs of different UEs in a same time resource may be achieved. For example, with a comb having an index of six, up to six SL-PRS transmissions of six UEs may be multiplexed in a same symbol or slot. In this example, a first UE may schedule the SL-PRS resources of the six UEs such that the SL-PRSs of the six UEs were FDMed in one symbol in one slot. The FDMing of the respective SL-PRS on a per symbol basis may be applied to the remainder of useable symbols in the one slot. The number of resource elements (REs) associated with each respective SL-PRS may be the same or different. Accordingly, the frequency domain bandwidth and the duration in the time domain of each respective SL-PRS may be the same or different. At the time scheduled for transmission of the six SL-PRSs, the first UE may be configured as a receiving UE and the six UEs (scheduled by the first UE) may each be configured as transmitting UEs. Interference between the simultaneous transmissions of the respective SL-PRSs by the six UEs may be avoided by the FDMing of the six SL-PRSs in the one slot. The unique parameters associated with the respective assignments of resources within an SL-PRS resource pool for the six respective SL-PRSs (e.g., respective frequency pattern, start frequency, duration, etc.) may be obtained by each of the six UEs based on a predefined rule or a dynamic assignment of the resources (i.e., time and frequency resources).

The SCI-2 format 600 may also include a SL-PRS resource reservation indicator 626. The SL-PRS resource reservation indicator 626 may indicate whether the resource for the SL-PRS transmission is reserved once (e.g., the SL-PRS transmission is a one-shot transmission that occurs only once), whether the resource for the SL-PRS transmission is reserved a predetermined or dynamically configured multiple number of times (e.g., for a predetermined or configured multiple number of SL-PRS transmissions), or whether the resource for the SL-PRS transmission is reserved with an ongoing predetermined periodicity (e.g., where the SL-PRS transmission is semi-statically scheduled (or semi-persistently scheduled (SPS)), where another signal may be sent to de-activate the transmissions of the semi-statically scheduled SL-PRSs).

Figure 7:
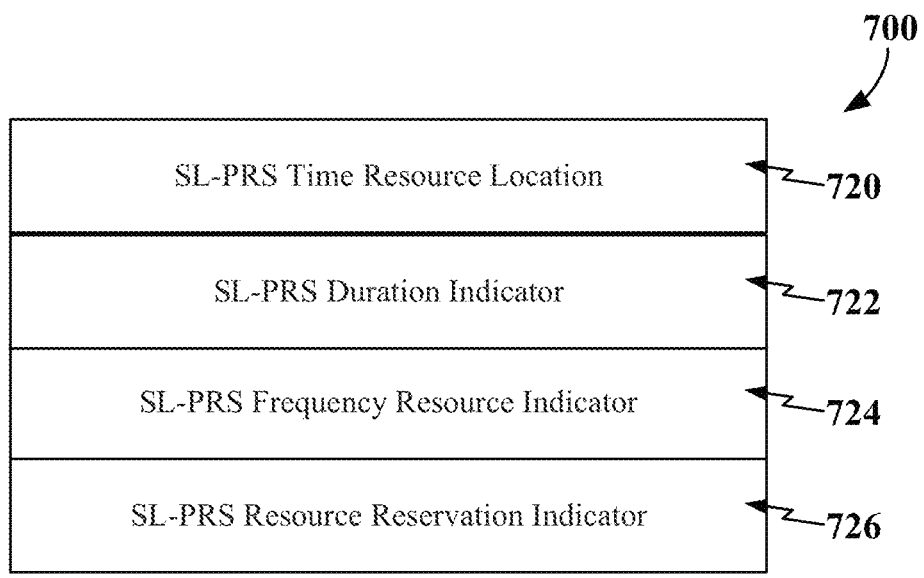
FIG. 7 is a diagram illustrating an example of a MAC control element configured for SL-PRS processes, according to some aspects.

FIG. 7 is a diagram illustrating an example of a MAC control element (MAC CE) 700 configured for SL-PRS processes, according to some aspects. According to one example, the parameters of the SL-PRS resource reservation message (similar to SL-PRS resource reservation message 516 as shown and described in connection with FIG. 5) may be conveyed in the transport block associated with a SCI-2. The MAC CE 700 of FIG. 7 may be carried in such a transport block.

The MAC CE 700 may include the following parameters: SL-PRS time resource location 720, SL-PRS duration indicator 722, SL-PRS frequency resource indicator 724, and/or SL-PRS resource reservation indicator 726. These parameters may be the same or similar to the like-named parameters associated with reference number 618 (e.g., SL-PRS time resource location 620, SL-PRS duration indicator 622, SL-PRS frequency resource indicator 624, and/or SL-PRS resource reservation indicator 626) of the SCI-2 format 600 of FIG. 6. Accordingly, the descriptions of these parameters will not be repeated to avoid redundancy.

The SCI-2 format 600 of FIG. 6 and the MAC CE 700 of FIG. 7 are two examples of SL-PRS resource reservation messages (similar to SL-PRS resource reservation message 516 of FIG. 5) that may be utilized for cross-pool resource reservations. The SCI-2 format 600 of FIG. 6 and the MAC CE 700 of FIG. 7 may be used by a Tx UE to notify other UEs of the resources within a SL-PRS resource reservation pool that the Tx UE reserves for transmission of one or more SL-PRS(s). Other ways to convey the SL-PRS parameters/information are within the scope of the disclosure.

FIG. 8A is a portion of a resource grid 800 providing an example of a comb-6 type resource allocation for the SL-PRSs of three UEs according to aspects described herein. FIG. 8B is a portion of a resource grid 801 providing an example of a back-to-back time domain resource allocation for SL-PRSs of two UEs according to aspects described herein. In FIGS. 8A and 8B, time is illustrated along the horizontal axis in units of OFDM symbols, while frequency is illustrated along the vertical axis in units of sub-carriers. One PRB in frequency and one slot in time are depicted for ease of illustration and not limitation.

Turning to FIG. 8A, by way of context, the resource grid 800 may be a snapshot of resources that a "reserving" UE had reserved for the use of a first UE (UE-1), a second UE (UE-2), and a third UE (UE-3). The reserving UE is distinct from UE-1, UE-2, and UE-3. At the time of transmission of the three SL-PRSs FDMed in the slot depicted in the resource grid 800, the reserving UE (not shown) may be configured as a receiving UE and each of UE-1, UE-2, and UE-3 may be configured as transmitting UEs. In each OFDM symbol, each of the SL-PRS of UE-1 802 occurs 6 subcarriers from its predecessor, each of the SL-PRS of UE-2 804 occurs 6 subcarriers from its predecessor, and each of the SL-PRS of UE-3 806 occurs 6 subcarriers from its predecessor. While the FDMing of the three distinct SL-PRSs of three respective UEs is depicted in FIG. 8A, up to six SL-PRS transmissions of up to six UEs may be FDMed in a same symbol or slot by utilizing the comb-6 type pattern of FIG. 8A. Other comb patterns, such as but not limited to comb-2 and comb-4 type patterns, are within the scope of the disclosure. As described above, the SL-PRS frequency resource indicator 624, 724 conveyed in an SCI-2 or MAC CE, as shown and described in FIGS. 6 and 7, respectively, may indicate that a SL-PRS may be mapped to a SL-PRS resource in a comb pattern. According to some examples, the reserving UE may utilize the SL-PRS frequency resource indicator 624 (or some other indicator) in a SL-PRS resource reservation message, to indicate a comb index or comb offset. In still a further example, the SL-PRS frequency resource indicator 624 (or some other indicator) may be used to indicate a frequency pattern for transmission of SL-PRS(s). Accordingly, for example, the index of a comb may be flexible (for example, each frequency pattern may correspond to a different comb index).

Turning to FIG. 8B, by way of context, the resource grid 801 may be a snapshot of resources that a first UE (UE-1) had reserved for its use and the use of a second UE (UE-2). UE-1 is distinct from UE-2. UE-1 had reserved the first half of usable symbols (e.g., OFDM symbols 0-5) for transmission of its SL-PRS and reserved the second half of usable symbols (e.g., OFDM symbols 6-11) for transmission of the SL-PRS of UE-2. For the first half of the slot, UE-1 is a Tx UE and UE-2 is a Rx UE. For the second half of the slot, UE-1 is a Rx UE and UE-2 is a Tx UE. The transmissions of the respective UE's are back-o-back in the slot. Other patterns, such as but not limited to a pattern where the number of OFDM symbols allotted to each UE is not equal, and patterns where the OFDM symbols assigned to the first UE and those allocated to the second UE are not contiguous, are within the scope of the disclosure. As described in connection with FIG. 8B, the various SL-PRS parameters shown and described in connection with FIGS. 6 and 7 may be conveyed in an SCI-2 or MAC CE, for example, and may be utilized by the respective UEs to map their respective SL-PRS resources (i.e., time-frequency resources) in accordance with various patterns, such as the pattern depicted in FIG. 8B.

Figure 9:
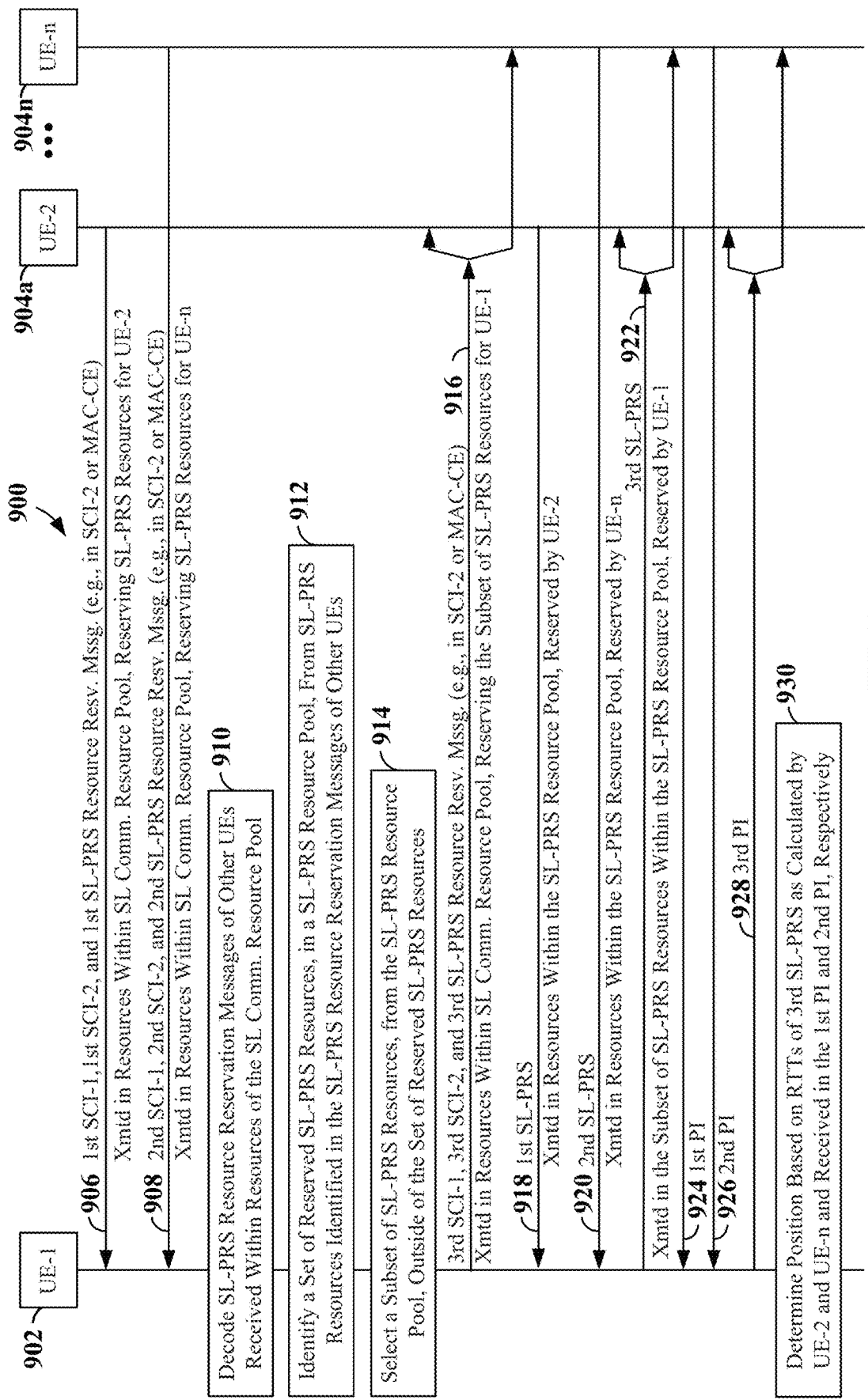
FIG. 9 is a call flow diagram illustrating exemplary signaling between three UEs in connection with sidelink positioning according to some aspects.

FIG. 9 is a call flow diagram 900 illustrating exemplary signaling between three UEs (UE-1 902, UE-2 904a, and UE-n 904n) in connection with sidelink positioning according to some aspects. Each of UE-1 902 and UE-2 904a through 904n may be any of the UEs, sidelink (e.g., V2X, D2D, etc.) devices, or other scheduled entities shown in FIGS. 1 and/or 3.

At 906, UE-1 902 may receive a first SCI-1, a first SCI-2, and a first SL-PRS resource reservation message (e.g., in the SCI-2 or in connection with a MAC CE) from UE-2 904a. UE-2 904a may transmit the first SCI-1, first SCI-2, and first SL-PRS resource reservation message in resources within a sidelink (SL) communication resource pool (similar to the SL communication resource pool 510b shown and described in connection with FIG. 5). The first SL-PRS resource reservation message (similar to the SL-PRS resource reservation message 516 shown and described in connection with FIG. 5) may reserve resources within a SL-PRS resource pool (similar to the SL-PRS resource pool 512b shown and described in connection with FIG. 5) for use by UE-2 904a. The SL communication resource pool may be distinct from the SL-PRS resource pool.

At 908, UE-1 902 may receive a second SCI-1, second SCI-2, and a second SL-PRS resource reservation message (e.g., in the SCI-2 or in connection with a MAC CE) from UE-n 904n (where n is a positive integer greater than one). UE-n 904n may transmit the second SCI-1, second SCI-2, and second SL-PRS resource reservation message in resources within the SL communication resource pool. The second SL-PRS resource reservation message may reserve resources within the SL-PRS resource pool for use by UE-n 904n.

The first and second SCI-1 may indicate, among other things, respective resource allocations of respective SCI-2s and their associated transport blocks. Each of the first and second SCI-1s are decodable by UEs within the range of UE-2 904a and UE-n 904n, respectively. Each UE may decode the respective SCI-1s of the other UEs to determine the reserved resources for respective SCI-2s and their associated transport blocks. In the example of FIG. 9, UE-1 902 and UE-2 904a through UE-n 904n are within the range of each other and may communicate with each other via sidelink mode 2, for example The first and second SL-PRS resource reservation messages (or parameters thereof) may be carried, for example, by SCI-2s or MAC CEs as described above in connection with FIG. 5. Use of SCI-2s and MAC CEs is for illustrative and non-limiting purposes. For SL-PRS resource reservation messages carried by SCI-2s, the SCI-2s may be configured according to the exemplary SCI-2 format 600 as shown and described in connection with FIG. 6. For SL-PRS resource reservation messages carried by MAC CEs, the MAC CEs may be configured according to the exemplary MAC CE 700 as shown and described in connection with FIG. 7. Other configurations and conveyances of SL-PRS parameters are within the scope of the disclosure.

At 910, using information from the respective SCI-1s, UE-1 902 may decode the respective SL-PRS resource reservation messages of other UEs received in the resources within the SL communication resource pool (including UE-2 904a through UE-n 904n) by decoding respective SCI-2s or, if the SL-PRS resource reservation messages were carried in respective MAC CEs, by decoding the respective MAC CE carried in a transport block associated with the respective SCI-2. As indicated, decoding may be facilitated by information in the first and second SCI-1s. According to some aspects, the destination identifiers of the respective SCI-2s may indicate that the respective SCI-2s (and by extension the respective first and second SL-PRS resource reservation messages) were broadcast (as distinct from unicast or groupcast). The broadcast of a SL-PRS resource reservation messages from a transmitting UE may inform neighboring UEs of the SL-PRS resources reserved by the transmitting UE. Accordingly, a single SL-PRS resource reservation message carried in a single PSSCH having a single SCI-2 may be broadcast to all neighboring UEs, rather than unicasting separate SL-PRS resource reservation messages to single UEs or groupcasting a single SL-PRS resource reservation to a group of UEs (where some neighboring UEs may not be members of the group of UEs, for example).

Decoding of respective SL-PRS resource reservation messages (or data thereof) at 910 may correspond to decoding of the respective SCI-2s in instances where the respective SL-PRS resource reservation messages (or data thereof) are included in the respective SCI-2s. Decoding of respective SL-PRS resource reservation messages (or data thereof) at 910 may correspond to decoding of respective MAC CEs in transport blocks associated with the respective SCI-2s in instances where the respective SL-PRS resource reservation messages (or data thereof) are included in the respective MAC CEs. Decoding of the respective MAC CEs (carried in respective transport blocks associated with the respective SCI-2s) may be facilitated by information in the respective SCI-2s.

At 912, UE-1 902 may identify a set (e.g., compile a list) of reserved SL-PRS resources within the SL-PRS resource pool from SL-PRS resources identified in the respective SL-PRS resource reservation messages of other UEs, including UE-2 904a through UE-n 904n.

At 914, UE-1 902 may select a subset of SL-PRS resources, from within the SL-PRS resource pool, outside the set of reserved SL-PRS resources identified at 912. The selected subset of SL-PRS resources may be reserved by UE-1 902 for transmission of its (UE-1's) SL-PRS. The selected subset of SL-PRS resources may include resources that UE-2 904a through UE-n 904n did not reserve. The selected subset of SL-PRS resources may be similar to the subset 514 of resources within the SL-PRS resource pool 512b shown and described in connection with FIG. 5.

At 916, UE-1 902 may broadcast a third SCI-1, a third SCI-2, and a third SL-PRS resource reservation message (e.g., in the SCI-2 or in connection with a MAC CE) to neighboring UEs including UE-2 904a through UE-n 904n. The third SCI-1 need not have any modification made in view of an upcoming SL-PRS transmission from UE-1 902. That is, the third SCI-1 (as well as the first and second SCI-1) may be SL-PRS agnostic. The third SL-PRS resource reservation message (or data thereof) may be carried in a SCI-2 or a MAC CE (where the MAC CE may be carried in a transport block associated with the SCI-2). The third SL-PRS resource reservation message, may reserve the subset of SL-PRS resources selected at 914. The subset of SL-PRS resources selected at 914 may be resources within the SL-PRS resource pool. The third SL-PRS resource reservation message may be transmitted in resources within the SL communication resource pool, where the SL-PRS resource pool is distinct from the SL-PRS resource pool.

At 918, UE-1 902 may receive a first SL-PRS from UE-2 904a. The first SL-PRS may be transmitted in resources within the SL-PRS resource pool that were reserved by UE-2 904a at 906.

At 920, UE-1 902 may receive a second SL-PRS from UE-n 904n. The second SL-PRS may be transmitted in resources within the SL-PRS resource pool that were reserved by UE-n 904n at 908.

At 922, UE-1 902 may broadcast a third SL-PRS (to UE-2 904a through UE-n 904n). The third SL-PRS may be transmitted in the subset of SL-PRS resources within the SL-PRS resource pool that were reserved by UE-1 at 916.

At 924, UE-2 904a may transmit a first positioning information (PI) obtained based on the transmitted and received SL-PRSs at 918, 920, 922. For example, at 924, UE-2 904a may transmit the first PI including a first RTT between UE-1 902 and UE-2 904a. The first RTT may be obtained by UE-2 904a and based on a calculation of a difference between a known transmit time of the third SL-PRS at 922 (from UE-1 902) and a measured receive time of the $3^{rd}$ SL-PRS at UE-2 904a. The first PI may also include a RTT between UE-n 904n and UE-2 902 based on a calculation of a difference between a known transmit time of the second SL-PRS at 920 (from UE-n 904n) and a measured receive time of the second SL-PRS at UE-2 904a.

Similarly, at 926, UE-n 904n may transmit a second PI obtained based on the transmitted and received SL-PRSs at 918, 920, 922. For example, at 926, UE-n 904n may transmit the second PI including a second RTT between UE-1 902 and UE-n 904n. The second RTT may be obtained by UE-n 904n and based on a calculation of a difference between the known transmit time of the third SL-PRS at 922 (from UE-1 902) and a measured receive time of the third SL-PRS at UE-n 904n. The second PI may also include a RTT between UE-n 904n and UE-2 904a based on a calculation of a difference between a known transmit time of the first SL-PRS at 918 (from UE-2 904a) and a measured receive time of the first SL-PRS at UE-n 904n.

Similarly, at 928, UE-1 902 may transmit a third PI obtained based on the transmitted and received SL-PRSs at 918, 920, 922. For example, at 928, UE-1 902 may transmit the third PI including a third RTT between UE-1 902 and UE-2 904a. The third RTT may be obtained by UE-1 902 and based on a calculation of a difference between a known transmit time of the first SL-PRS at 918 (from UE-2 904a) and a measured receive time of the first SL-PRS at UE-1 902. The third PI may also include a fourth RTT between UE-n 904n and UE-1 902 based on a calculation of a difference between a known transmit time of the second SL-PRS at 920 (from UE-n 904n) and a measured receive time of the second SL-PRS at UE-1 902.

At 932, UE-1 902 may determine its position based on the RTTs of the third SL-PRS (transmitted at 922) as calculated by UE-2 904a (as the first RTT above) and UE-n 904n (as the second RTT above) and received in the first PI at 924 and the second PI at 926, respectively.

Each given UE (e.g., UE-1 902 through UE-n 904n) may include the respective RTTs calculated between the given UE and all other UEs in its (the given UE's) respective PI and may transmit its respective PI to all participating UEs (e.g., UE-1 902 through UE-n 904n). Each given UE may further include a location (e.g., geographical coordinates) of the given UE in its respective PI, if known.

Based on received PIs, a respective UE may discern the respective UE's relative position or absolute position (e.g., geographical coordinates). In examples in which a respective UE has zero or inaccurate knowledge of its position, the received PIs may be utilized by the respective UE to yield an inter-UE range between the respective UE and the UE transmitting the received PI. In examples in which a respective UE has accurate knowledge of its position (e.g., based on a GNSS-based positioning, receipt of multiple PIs from multiple UEs, or in the case where the respective UE (such as a roadside unit (RSU)) is at a fixed and known location), the PI of the respective UE (e.g., together with other PIs received during a sidelink positioning session) may be utilized by the respective UE to yield an absolute position of the respective UE.

Figure 10:
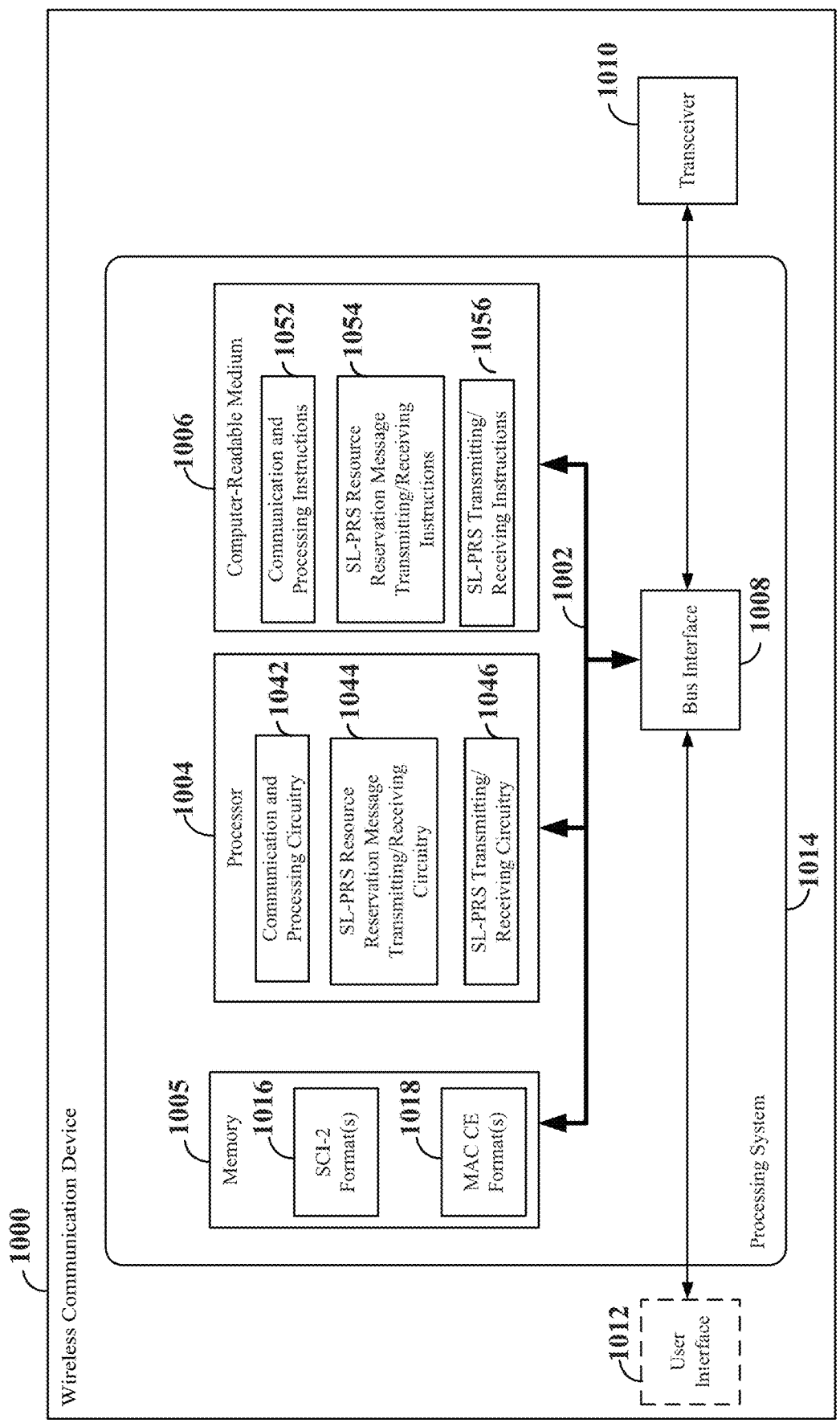
FIG. 10 is a block diagram illustrating an example of a hardware implementation for a wireless communication device employing a processing system according to some aspects.

FIG. 10 is a block diagram illustrating an example of a hardware implementation for a wireless communication device 1000 employing a processing system 1014 according to some aspects. For example, the wireless communication device 1000 may correspond to a sidelink device, such as a V2X device, D2D device, or other UE or wireless communication device configured for sidelink or D2D communication, as shown and described above in reference to FIGS. 1, 3, and/or 9. The wireless communication device may operate in sidelink mode 2 as a transmitting UE and/or a receiving UE.

The wireless communication device 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1000 may be configured to perform any one or more of the functions described herein. That is, the processor 1004, as utilized in the wireless communication device 1000, may be used to implement any one or more of the processes and procedures described below.

The processor 1004 may in some instances be implemented via a baseband or modem chip and in other implementations, the processor 1004 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further.

A bus interface 1008 provides an interface between the bus 1002 and a transceiver 1010. The transceiver 1010 provides a communication interface or a means for communicating with various other apparatus over a transmission medium (e.g., air interface). Depending upon the nature of the apparatus, a user interface 1012 (e.g., keypad, display, touch screen, speaker, microphone, control knobs, etc.) may also be provided. Of course, such a user interface 1012 is optional, and may be omitted in some examples.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software. For example, the memory 1005 may store one or more SCI-2 format(s) 1016 and one or more MAC CE format(s) 1018 used by the processor 1004 in connection with the generation of SL-PRS resource reservation messages in sidelink positioning.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. In some examples, the computer-readable medium 1006 may be part of the memory 1005. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include communication and processing circuitry 1042, configured to communicate with one or more sidelink devices (e.g., other UEs) via respective sidelinks (e.g., PC5 interfaces). In addition, the communication and processing circuitry 1042 may be configured to communicate with a base station (e.g., gNB or eNB) via a Uu link. In some examples, the communication and processing circuitry 1042 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1042 may include one or more transmit/receive chains.

In some implementations where the communication involves receiving information, the communication and processing circuitry 1042 may obtain information from a component of the wireless communication device 1000 (e.g., from the transceiver 1010 that receives the information via radio frequency signaling or some other type of signaling suitable for the applicable communication medium), process (e.g., decode) the information, and output the processed information. For example, the communication and processing circuitry 1042 may output the information to another component of the processor 1004, to the memory 1005, or to the bus interface 1008. In some examples, the communication and processing circuitry 1042 may receive one or more of signals, messages, other information, or any combination thereof. In some examples, the communication and processing circuitry 1042 may receive information via one or more channels. In some examples, the communication and processing circuitry 1042 may include functionality for a means for receiving. In some examples, the communication and processing circuitry 1042 may include functionality for a means for processing, including a means for demodulating, a means for decoding, etc.

In some implementations where the communication involves sending (e.g., transmitting) information, the communication and processing circuitry 1042 may obtain information (e.g., from another component of the processor 1004, the memory 1005, or the bus interface 1008), process (e.g., modulate, encode, etc.) the information, and output the processed information. For example, the communication and processing circuitry 1042 may output the information to the transceiver 1010 (e.g., that transmits the information via radio frequency signaling or some other type of signaling suitable for the applicable communication medium). In some examples, the communication and processing circuitry 1042 may send one or more signals, messages, other information, or any combination thereof. In some examples, the communication and processing circuitry 1042 may send information via one or more channels. In some examples, the communication and processing circuitry 1042 may include functionality for a means for sending (e.g., a means for transmitting). In some examples, the communication and processing circuitry 1042 may include functionality for a means for generating, including a means for modulating, a means for encoding, etc.

The processor 1004 may further include SL-PRS resource reservation message transmitting/receiving circuitry 1044, configured, for example, to generate a first SL-PRS resource reservation message (where, for example, the first SL-PRS resource reservation message (or data thereof) may be included in a SCI-2 or a MAC CE) and, in conjunction with the transceiver 1010, to transmit the first SL-PRS resource reservation message within resources in a SL communication resource pool, where the first SL-PRS resource reservation message may identify a first SL-PRS resource within a SL-PRS resource pool, and the SL communication resource pool is different from the SL-PRS resource pool.

The SL-PRS resource reservation message transmitting/receiving circuitry 1044 may further be configured to receive, in conjunction with the transceiver 1010, a first sidelink-positioning reference signal (SL-PRS) resource reservation message within resources in a SL communication resource pool, where the first SL-PRS resource reservation message may identify a first SL-PRS resource within a SL-PRS resource pool, and the SL communication resource pool is different from the SL-PRS resource pool. The first SL-PRS resource reservation message (transmitted and/or received) may include SL-PRS related parameters that may be included in, for example, a SCI-2 configured in a SCI-2 format selected from one or more SCI-2 format(s) 1016 stored in the memory 1005 or in a MAC CE configured in a MAC CE format selected from one or more MAC CE format(s) 1018 stored in the memory 1005, for example. By way of example and not limitation, the SCI-2 may be formatted according to the SCI-2 format shown and described in connection with FIG. 6 and the MAC CE may be formatted according to the MAC CE format shown and described in connection with FIG. 7.

According to some aspects, the SL-PRS resource pool may be reserved for SL-PRS signaling and the SL communication resource pool may be reserved for communication of at least one sidelink control or sidelink data. According to some aspects, the first SL-PRS resource reservation message may identify a given time in the SL-PRS resource pool corresponding to transmission the first SL-PRS. According to some aspects, the first SL-PRS resource reservation message may identify a starting resource element in the SL-PRS resource pool corresponding to transmission of the first SL-PRS. According to some aspects, the first SL-PRS may be mapped to the first SL-PRS resource in a comb pattern, such as but not limited to, the comb pattern shown and described in connection with FIG. 8A. In some examples, the wireless communication device 1000 may be one of at least two wireless communication devices in a group of wireless communication devices that together utilize respective round trip time measurements, based on transmissions of respective SL-PRSs, including the first SL-PRS, to determine a physical location of the wireless communication device.

The SL-PRS resource reservation message transmitting/receiving circuitry 1044 may further be configured to receive a second SL-PRS resource reservation message in the SL communication resource pool from another wireless communication device, where the second SL-PRS resource reservation message identifies a second SL-PRS resource within the SL-PRS resource pool, and may still further be configured to select the first SL-PRS resource from resources within the SL-PRS resource pool that exclude the second SL-PRS resource.

The SL-PRS resource reservation message transmitting/receiving circuitry 1044 may further be configured to at least one of: transmit the first SL-PRS utilizing a given time resource of the SL-PRS resource pool over an entirety of a bandwidth of the SL-PRS resource pool or transmit the first SL-PRS utilizing the given time resource of the SL-PRS resource pool over a sub-band of the bandwidth of the SL-PRS resource pool. According to some aspects, the sub-band may be identified in the first SL-PRS resource reservation message.

The SL-PRS resource reservation message transmitting/receiving circuitry 1044 may further be configured to at least one of: transmit the first SL-PRS in resources within the SL-PRS resource pool once, transmit the first SL-PRS in the resources within the SL-PRS resource pool more than once, transmit the first SL-PRS as one of a predetermined plurality of transmitted respective SL-PRSs in a corresponding plurality of respective SL-PRS resource pools, or transmit the first SL-PRS as one of a semi-statically configured transmission of a plurality of respective SL-PRSs in the corresponding plurality of respective SL-PRS resource pools.

The SL-PRS resource reservation message transmitting/receiving circuitry 1044 may further be configured to reserve a different SL-PRS resource identified in a different SL-PRS resource reservation message for use by another wireless communication device and/or reserve the first SL-PRS resource in the first SL-PRS resource reservation message for a shared use by the wireless communication device and another wireless communication device.

According to some aspects, the SL-PRS resource reservation message transmitting/receiving circuitry 1044 may further be configured to receive, in cooperation with the transceiver 1010, a second SL-PRS resource reservation message in the SL communication resource pool from a second wireless communication device and decode the second SL-PRS resource reservation message, where the second SL-PRS resource reservation message may identify a second SL-PRS resource in the resources within the SL-PRS resource pool. The SL-PRS resource reservation message transmitting/receiving circuitry 1044, may further be configured to execute SL-PRS resource reservation message transmitting/receiving instructions (software) 1054 stored in the computer-readable medium 1006 to implement one or more of the functions described herein.

The processor 1004 may further include SL-PRS transmitting/receiving circuitry 1046, configured to generate a first SL-PRS and, together with the transceiver 1010, to transmit the first SL-PRS in the first SL-PRS resource within the SL-PRS resource pool. According to some aspects, the first SL-PRS in the first SL-PRS resource within the SL-PRS resource pool may be transmitted in an absence of transmitting a control signal associated with the first SL-PRS in resources within the SL-PRS resource pool. Furthermore, in an instance where the first SL-PRS is received instead of transmitted, the SL-PRS transmitting/receiving circuitry 1046 may further be configured to receive the first SL-PRS (e.g., from a first wireless communication device) in a first SL-PRS resource within the SL-PRS resource pool. According to some aspects, the first SL-PRS in the first SL-PRS resource within the SL-PRS resource pool may be received in an absence of receiving a first control signal associated with the first SL-PRS in resources within the SL-PRS resource pool. Still further, the SL-PRS transmitting/receiving circuitry 1046, may further be configured to receive the second SL-PRS in the second SL-PRS resource within the SL-PRS resource pool. According to some aspects, the second SL-PRS in the first SL-PRS resource within the SL-PRS resource pool may be received in an absence of receiving a second control signal associated with the second SL-PRS within the SL-PRS resource pool, where the second SL-PRS resource may be different from the first SL-PRS resource. Still further, the SL-PRS transmitting/receiving circuitry 1046 may be configured to execute SL-PRS generating/receiving instructions (software) 1056 stored in the computer-readable medium 1006 to implement one or more of the functions described herein.

Figure 11:
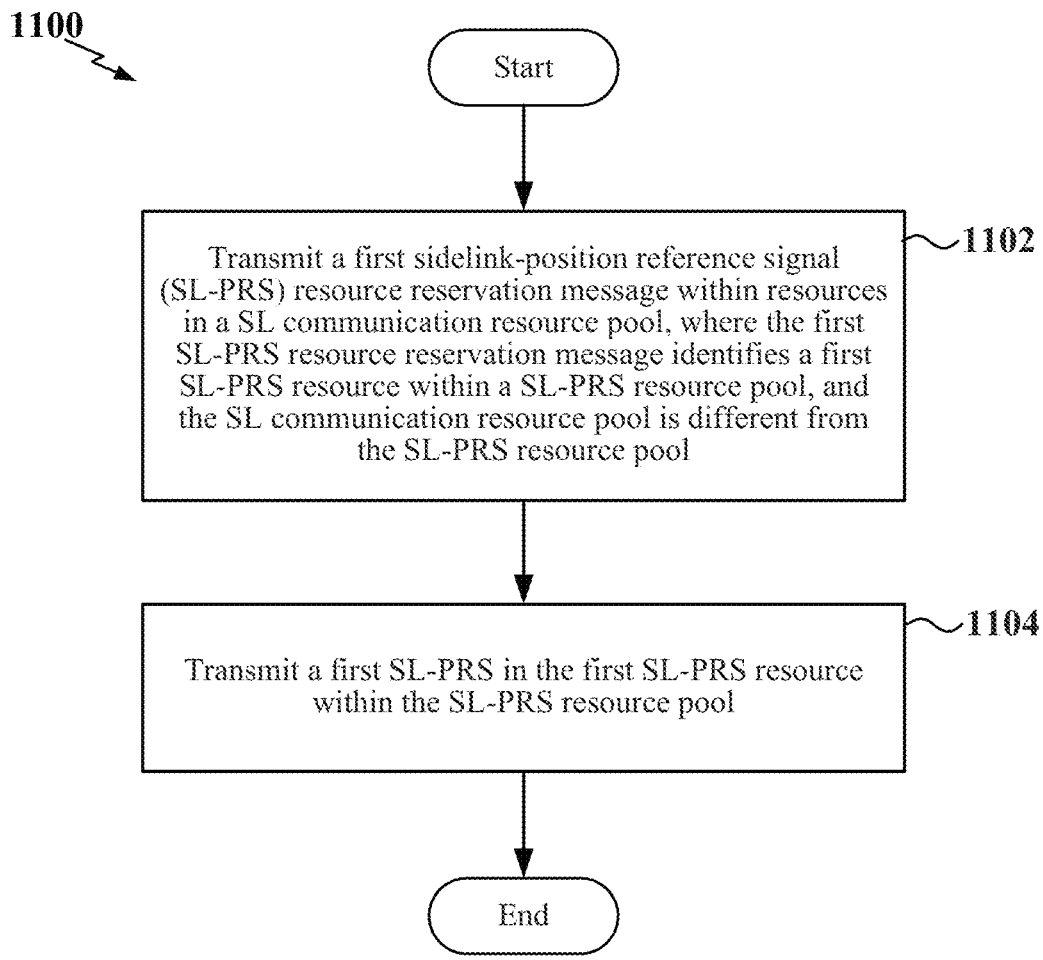
FIG. 11 is a flow chart of an exemplary method of wireless communication in a wireless communication network according to some aspects.

FIG. 11 is a flow chart of an exemplary method of wireless communication 1100 in a wireless communication network according to some aspects. As described below, some or all illustrated features may be omitted in a particular implementation within the scope of the present disclosure, and some illustrated features may not be required for implementation of all examples. In some examples, the method may be performed by the wireless communication device 1000, as described above and illustrated in FIG. 10, by a processor or processing system, or by any suitable means for carrying out the described functions.

At block 1102, the wireless communication device (e.g., a first wireless communication device configured for sidelink communication) may transmit a first sidelink-positioning reference signal (SL-PRS) resource reservation message within resources in a SL communication resource pool, where the first SL-PRS resource reservation message identifies a first SL-PRS resource within a SL-PRS resource pool, and the SL communication resource pool is different from the SL-PRS resource pool. For example, the communication and processing circuitry 1042, SL-PRS resource reservation message transmitting/receiving circuitry 1044, and/or transceiver 1010, shown and described above in connection with FIG. 10, may provide a means to transmit a first sidelink-positioning reference signal (SL-PRS) resource reservation message within resources in a SL communication resource pool, where the first SL-PRS resource reservation message identifies a first SL-PRS resource within a SL-PRS resource pool, and the SL communication resource pool is different from the SL-PRS resource pool.

At block 1104, the first wireless communication device may transmit a first SL-PRS in the first SL-PRS resource within the SL-PRS resource pool. According to some aspects, the first wireless communication device may transmit the first SL-PRS in an absence of transmitting a control signal associated with the first SL-PRS. In one example, the communication and processing circuitry 1042, SL-PRS transmitting/receiving circuitry 1046, and/or transceiver 1010, shown and described above in connection with FIG. 10, may provide a means to transmit a first SL-PRS in the first SL-PRS resource within the SL-PRS resource pool.

In some examples, the SL-PRS resource pool may be reserved for SL-PRS signaling and the SL communication resource pool may be reserved for communication of at least one sidelink control or sidelink data. In some examples, the first SL-PRS resource reservation message may identify a given time in the SL-PRS resource pool corresponding to transmission of the first SL-PRS. In some examples, the first SL-PRS resource reservation message may identify a starting resource element in the SL-PRS resource pool corresponding to transmission of the first SL-PRS. In some examples, the first SL-PRS may be mapped to the first SL-PRS resource in a comb pattern. According to some aspects, the wireless communication device may be one of at least two wireless communication devices in a group of wireless communication devices that together utilize respective round trip time measurements, based on transmissions of respective SL-PRSs, including the first SL-PRS, to determine a physical location of the wireless communication device. According to some aspects, the first SL-PRS resource reserved in the first SL-PRS resource reservation message may be reserved by the wireless communication device for use by another wireless communication device. According to still other aspects, the first SL-PRS resource reserved in the first SL-PRS resource reservation message may reserve the first SL-PRS resource for shared use by the wireless communication device and another wireless communication device.

Figure 12:
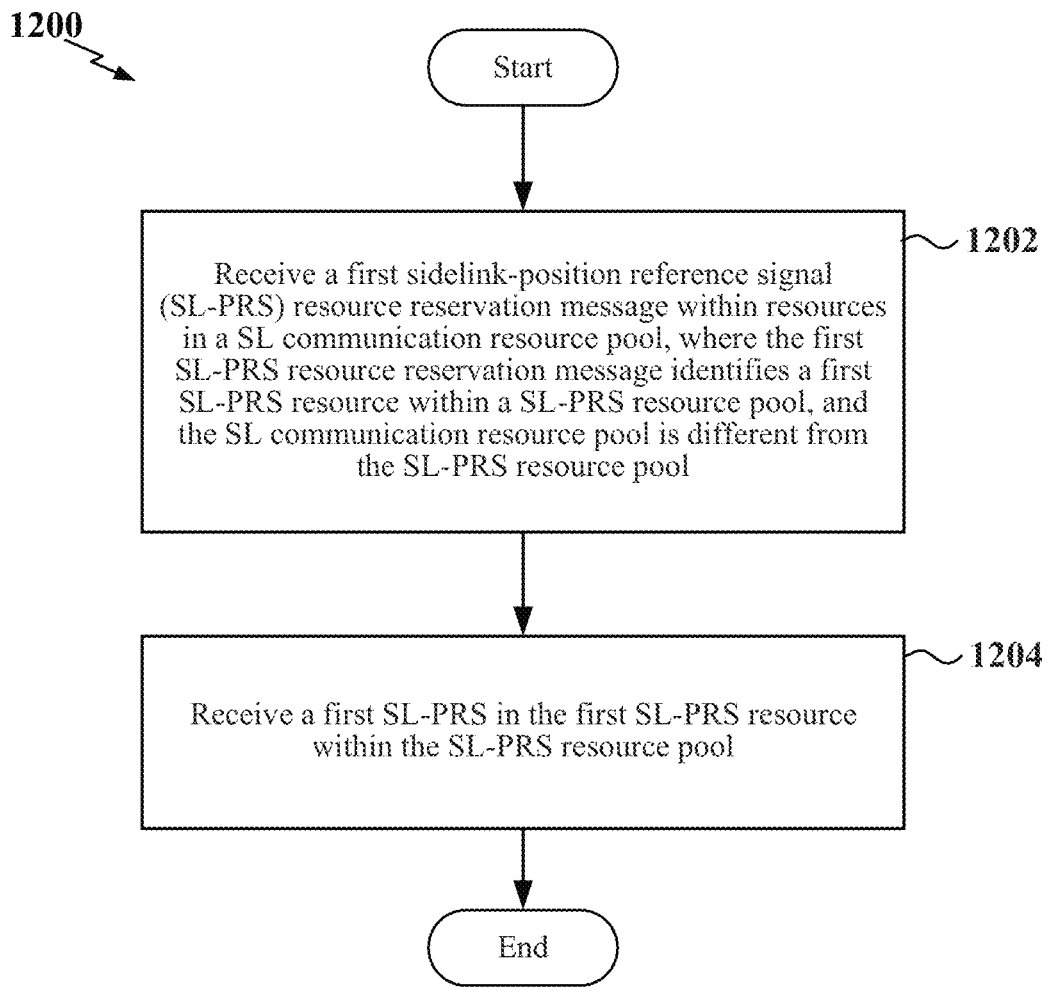
FIG. 12 is a flow chart of an exemplary method of wireless communication in a wireless communication network according to some aspects.

FIG. 12 is a flow chart of an exemplary method of wireless communication 1200 in a wireless communication network according to some aspects. As described below, some or all illustrated features may be omitted in a particular implementation within the scope of the present disclosure, and some illustrated features may not be required for implementation of all examples. In some examples, the method may be performed by the wireless communication device 1000, as described above and illustrated in FIG. 10, by a processor or processing system, or by any suitable means for carrying out the described functions.

At block 1202, the wireless communication device (e.g., a first wireless communication device configured for sidelink communication) may receive a first sidelink-positioning reference signal (SL-PRS) resource reservation message within resources in a SL communication resource pool (e.g., from a second wireless communication device configured for sidelink communication), where the first SL-PRS resource reservation message identifies a first SL-PRS resource within a SL-PRS resource pool, and the SL communication resource pool is different from the SL-PRS resource pool. For example, the communication and processing circuitry 1042, SL-PRS resource reservation message transmitting/receiving circuitry 1044, and/or transceiver 1010, shown and described above in connection with FIG. 10, may provide a means to receive a first sidelink-positioning reference signal (SL-PRS) resource reservation message within resources in a SL communication resource pool, where the first SL-PRS resource reservation message identifies a first SL-PRS resource within a SL-PRS resource pool, and the SL communication resource pool is different from the SL-PRS resource pool.

At block 1204, the wireless communication device may receive a first SL-PRS in the first SL-PRS resource within the SL-PRS resource pool (e.g., from the second wireless communication device). According to some aspects, the first SL-PRS may be received in an absence of receiving a first control signal associated with the first SL-PRS in resources within the SL-PRS resource pool. In one example, the communication and processing circuitry 1042, SL-PRS transmitting/receiving circuitry 1046, and/or transceiver 1010, shown and described above in connection with FIG. 10, may provide a means to receive a first SL-PRS in the first SL-PRS resource within the SL-PRS resource pool.

In some examples, the SL-PRS resource pool may be reserved for SL-PRS signaling and the SL communication resource pool may be reserved for communication of at least one sidelink control or sidelink data. In some examples, the first SL-PRS resource reservation message may identify a given time in the SL-PRS resource pool corresponding to transmission of the first SL-PRS. In some examples, the first SL-PRS resource reservation message may identify a starting resource element in the SL-PRS resource pool corresponding to transmission of the first SL-PRS. In some examples, the first SL-PRS may be mapped to the first SL-PRS resource in a comb pattern. According to some aspects, the wireless communication device may be one of at least two wireless communication devices in a group of wireless communication devices that together utilize respective round trip time measurements, based on transmissions of respective SL-PRSs, including the first SL-PRS, to determine a physical location of the wireless communication device. According to some aspects, the first SL-PRS resource reserved in the first SL-PRS resource reservation message may be reserved by the wireless communication device for use by another wireless communication device. According to still other aspects, the first SL-PRS resource reserved in the first SL-PRS resource reservation message may reserve the first SL-PRS resource for shared use by the wireless communication device and another wireless communication device.

Of course, in the above examples, the circuitry included in the processor 1004 is merely provided as an example, and other means for carrying out the described functions may be included within various aspects of the present disclosure, including but not limited to the instructions stored in the computer-readable medium 1006, or any other suitable apparatus or means described in any one of the FIGS. 1, 3, 9, and/or 10, and utilizing, for example, the processes and/or algorithms described herein in relation to FIGS. 5, 9, 11, and/or 12.

The processes shown in FIGS. 5, 9, 11, and/or 12 may include additional aspects, such as any single aspect or any combination of aspects described below and/or in connection with one or more other processes described elsewhere herein.

Aspect 1: A wireless communication device in a wireless communication network, comprising: a transceiver, a memory, and a processor communicatively coupled to the transceiver and the memory, wherein the processor and the memory are configured to: transmit a first sidelink-positioning reference signal (SL-PRS) resource reservation message within resources in a SL communication resource pool, wherein the first SL-PRS resource reservation message identifies a first SL-PRS resource within a SL-PRS resource pool, and the SL communication resource pool is different from the SL-PRS resource pool, and transmit a first SL-PRS in the first SL-PRS resource within the SL-PRS resource pool.

Aspect 2: The wireless communication device of aspect 1, wherein the SL-PRS resource pool is reserved for SL-PRS signaling and the SL communication resource pool is reserved for communication of at least one sidelink control or sidelink data.

Aspect 3: The wireless communication device of aspect 1 or 2, wherein the first SL-PRS is transmitted in an absence of transmitting a control signal associated with the first SL-PRS in resources within the SL-PRS resource pool.

Aspect 4: The wireless communication device of any of aspects 1 through 3, wherein the processor and the memory are further configured to: receive a second SL-PRS resource reservation message within the resources in the SL communication resource pool from another wireless communication device, wherein the second SL-PRS resource reservation message identifies a second SL-PRS resource within the SL-PRS resource pool; and select the first SL-PRS resource from resources within the SL-PRS resource pool that exclude the second SL-PRS resource.

Aspect 5: The wireless communication device of any of aspects 1 through 4, wherein the first SL-PRS resource reservation message identifies a given time in the SL-PRS resource pool to transmit the first SL PRS.

Aspect 6: The wireless communication device of any of aspects 1 through 5, wherein the first SL-PRS resource reservation message identifies a starting resource element in the SL-PRS resource pool for transmission of the first SL-PRS.

Aspect 7: The wireless communication device of any of aspects 1 through 6, wherein the first SL-PRS is mapped to the first SL-PRS resource in a comb pattern.

Aspect 8: The wireless communication device of any of aspects 1 through 7, wherein the processor and the transceiver are further configured to at least one of: transmit the first SL-PRS utilizing a given time resource of the SL-PRS resource pool over an entirety of a bandwidth of the SL-PRS resource pool; or transmit the first SL-PRS utilizing the given time resource of the SL-PRS resource pool over a sub-band of the bandwidth of the SL-PRS resource pool.

Aspect 9: The wireless communication device of any of aspects 1 through 8, wherein the processor and the transceiver are further configured to at least one of: transmit the first SL-PRS in resources within the SL-PRS resource pool once, transmit the first SL-PRS in resources within the SL-PRS resource pool more than once, transmit the first SL-PRS as one of a predetermined plurality of transmitted respective SL-PRSs in a corresponding plurality of respective SL-PRS resource pools, or transmit the first SL-PRS as one of a semi-statically configured transmission of a plurality of respective SL-PRSs in the corresponding plurality of respective SL-PRS resource pools.

Aspect 10: The wireless communication device of any of aspects 1 through 9, wherein the wireless communication device is one of at least two wireless communication devices in a group of wireless communication devices that together utilize respective round trip time measurements, based on transmissions of respective SL-PRSs, including the first SL-PRS, to determine a physical location of the wireless communication device.

Aspect 11: The wireless communication device of any of aspects 1 through 10, wherein the processor and the memory are further configured to: reserve a different SL-PRS resource identified in a different SL-PRS resource reservation message for use by another wireless communication device.

Aspect 12: The wireless communication device of any of aspects 1 through 11, wherein the processor and the memory are further configured to: reserve the first SL-PRS resource in the first SL-PRS resource reservation message for a shared use by the wireless communication device and another wireless communication device.

Aspect 13: A method of wireless communication at a wireless communication device in a wireless communication network comprising: transmitting a first sidelink-positioning reference signal (SL-PRS) resource reservation message within resources in a SL communication resource pool, wherein the first SL-PRS resource reservation message identifies a first SL-PRS resource within a SL-PRS resource pool, and the SL communication resource pool is different from the SL-PRS resource pool, and transmitting a first SL-PRS in the first SL-PRS resource within the SL-PRS resource pool.

Aspect 14: The method of aspect 13, further comprising: receiving a second SL-PRS resource reservation message in within the resources the SL communication resource pool from another wireless communication device, wherein the second SL-PRS resource reservation message identifies a second SL-PRS resource within the SL-PRS resource pool; and selecting the first SL-PRS resource from resources within the SL-PRS resource pool that exclude the second SL-PRS resource.

Aspect 15: The method of aspect 13 or 14, further comprising at least one of: transmitting the first SL-PRS utilizing a given time resource of the SL-PRS resource pool over an entirety of a bandwidth of the SL-PRS resource pool; or transmitting the first SL-PRS utilizing the given time resource of the SL-PRS resource pool over a sub-band of the bandwidth of the SL-PRS resource pool.

Aspect 16: The method of any of aspects 13 through 15, further comprising at least one of: transmitting the first SL-PRS in the SL-PRS resource pool once, transmitting the first SL-PRS in the SL-PRS resource pool more than once, transmitting the first SL-PRS as one of a predetermined plurality of transmitted respective SL-PRSs in a corresponding plurality of respective SL-PRS resource pools, or transmitting the first SL-PRS as one of a semi-statically configured transmission of a plurality of respective SL-PRSs in the corresponding plurality of respective SL-PRS resource pools.

Aspect 17. The method of any of aspects 13 through 16, further comprising: reserving a different SL-PRS resource identified in a different SL-PRS resource reservation message for use by another wireless communication device.

Aspect 18. The method of any of aspects 13 through 17, further comprising: reserving the first SL-PRS resource in the first SL-PRS resource reservation message for a shared use by the wireless communication device and another wireless communication device.

Aspect 19: A wireless communication device in a wireless communication network, comprising: a transceiver, a memory, and a processor communicatively coupled to the transceiver and the memory, wherein the processor and the memory are configured to utilize the transceiver to: receive a first sidelink-positioning reference signal (SL-PRS) resource reservation message within resources in a SL communication resource pool, wherein the first SL-PRS resource reservation message identifies a first SL-PRS resource within a SL-PRS resource pool, and the SL communication resource pool is different from the SL-PRS resource pool, and receive a first SL-PRS in the first SL-PRS resource within the SL-PRS resource pool.

Aspect 20: The wireless communication device of aspect 19, wherein the SL-PRS resource pool is reserved for SL-PRS signaling and the SL communication resource pool is reserved for communication of at least one sidelink control or sidelink data.

Aspect 21: The wireless communication device of aspect 19 or 20, wherein the first SL-PRS is received in an absence of receiving of a control signal associated with the first SL-PRS in resources within the SL-PRS resource pool.

Aspect 22: The wireless communication device of any of aspects 19 through 21, wherein the processor and the memory are further configured to: receive a second SL-PRS resource reservation message within the resources in the SL communication resource pool, wherein the second SL-PRS resource reservation message identifies a second SL-PRS resource within the SL-PRS resource pool, and receive a second SL-PRS in the second SL-PRS resource within the SL-PRS resource pool, wherein the second SL-PRS resource is different from the first SL-PRS resource.

Aspect 23: The wireless communication device of any of aspects 19 through 22, wherein the first SL-PRS resource reservation message identifies a given time in the SL-PRS resource pool corresponding to transmission of the first SL-PRS.

Aspect 24: The wireless communication device of any of aspects 19 through 23, wherein the first SL-PRS resource reservation message identifies a starting resource element in the SL-PRS resource pool corresponding to transmission of the first SL-PRS.

Aspect 25: The wireless communication device of any of aspects 19 through 24, wherein the first SL-PRS is mapped to the first SL-PRS resource in a comb pattern.

Aspect 26: The wireless communication device of any of aspects 19 through 25, wherein the processor and the transceiver are further configured to least one of: receive the first SL-PRS utilizing a given time resource of the SL-PRS resource pool over an entirety of a bandwidth of the SL-PRS resource pool; or receive the first SL-PRS utilizing the given time resource of the SL-PRS resource pool over a sub-band of the bandwidth of the SL-PRS resource pool.

Aspect 27: The wireless communication device of any of aspects 19 through 26, wherein the processor and the transceiver are further configured to least one of: receive the first SL-PRS in the SL-PRS resource pool once, receive the first SL-PRS in the SL-PRS resource pool more than once, receive the first SL-PRS as one of a predetermined plurality of received respective SL-PRSs in a corresponding plurality of respective SL-PRS resource pools, or receive the first SL-PRS as one of a semi-statically configured transmission of a plurality of respective SL-PRSs in the corresponding plurality of respective SL-PRS resource pools.

Aspect 28: The wireless communication device of any of aspects 19 through 27, wherein the wireless communication device is one of at least two wireless communication devices in a group of wireless communication devices that together utilize respective round trip time measurements, based on transmissions of respective SL-PRSs, including the first SL-PRS, to determine a physical location of the wireless communication device.

Aspect 29: The wireless communication device of any of aspects 19 through 28, wherein the first SL-PRS resource reserved in the first SL-PRS resource reservation message is reserved by the wireless communication device for use by another wireless communication device.

Aspect 30: The wireless communication device of any of aspects 19 through 29, wherein the first SL-PRS resource reserved in the first SL-PRS resource reservation message reserves the first SL-PRS resource for shared use by the wireless communication device and another wireless communication device.

Aspect 31: An apparatus configured for wireless communication comprising at least one means for performing a method of any one of aspects 13 through 18.

Aspect 32: A non-transitory computer-readable medium storing computer-executable code, comprising code for causing an apparatus to perform a method of any one of aspects 13 through 18.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 9, and/or 10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. Additionally, a phrase referring to "A and/or B" is intended to cover A, B, and A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A wireless communication device in a wireless communication network, comprising:
   a transceiver;
   a memory; and
   a processor communicatively coupled to the transceiver and the memory, wherein the processor and the memory are configured to:

transmit a first sidelink-positioning reference signal (SL-PRS) resource reservation message within resources in a SL communication resource pool, wherein the first SL-PRS resource reservation message identifies a first SL-PRS resource within a SL-PRS resource pool, and the SL communication resource pool is different from the SL-PRS resource pool; and transmit a first SL-PRS in the first SL-PRS resource within the SL-PRS resource pool.

2. The wireless communication device of claim 1, wherein the SL-PRS resource pool is reserved for SL-PRS signaling and the SL communication resource pool is reserved for communication of at least one sidelink control or sidelink data.

3. The wireless communication device of claim 1, wherein the first SL-PRS is transmitted in an absence of transmitting a control signal associated with the first SL-PRS in resources within the SL-PRS resource pool.

4. The wireless communication device of claim 1, wherein the processor and the memory are further configured to:

receive a second SL-PRS resource reservation message within the resources in the SL communication resource pool from another wireless communication device, wherein the second SL-PRS resource reservation message identifies a second SL-PRS resource within the SL-PRS resource pool; and select the first SL-PRS resource from resources within the SL-PRS resource pool that exclude the second SL-PRS resource.

5. The wireless communication device of claim 1, wherein the first SL-PRS resource reservation message identifies a given time in the SL-PRS resource pool to transmit the first SL-PRS.

6. The wireless communication device of claim 1, wherein the first SL-PRS resource reservation message identifies a starting resource element in the SL-PRS resource pool for transmission of the first SL-PRS.

7. The wireless communication device of claim 1, wherein the first SL-PRS is mapped to the first SL-PRS resource in a comb pattern.

8. The wireless communication device of claim 1, wherein the processor and the transceiver are further configured to at least one of:

transmit the first SL-PRS utilizing a given time resource of the SL-PRS resource pool over an entirety of a bandwidth of the SL-PRS resource pool; or transmit the first SL-PRS utilizing the given time resource of the SL-PRS resource pool over a sub-band of the bandwidth of the SL-PRS resource pool.

9. The wireless communication device of claim 1, wherein the processor and the transceiver are further configured to at least one of:

transmit the first SL-PRS in resources within the SL-PRS resource pool once, transmit the first SL-PRS in resources within the SL-PRS resource pool more than once, transmit the first SL-PRS as one of a predetermined plurality of transmitted respective SL-PRSs in a corresponding plurality of respective SL-PRS resource pools, or transmit the first SL-PRS as one of a semi-statically configured transmission of a plurality of respective SL-PRSs in the corresponding plurality of respective SL-PRS resource pools.

10. The wireless communication device of claim 1, wherein the wireless communication device is one of at least two wireless communication devices in a group of wireless communication devices that together utilize respective round trip time measurements, based on transmissions of respective SL-PRSs, including the first SL-PRS, to determine a physical location of the wireless communication device.

11. The wireless communication device of claim 1, wherein the processor and the memory are further configured to:

reserve a different SL-PRS resource identified in a different SL-PRS resource reservation message for use by another wireless communication device.

12. The wireless communication device of claim 1, wherein the processor and the memory are further configured to:

reserve the first SL-PRS resource in the first SL-PRS resource reservation message for a shared use by the wireless communication device and another wireless communication device.

13. A method of wireless communication at a wireless communication device in a wireless communication network comprising:

transmitting a first sidelink-positioning reference signal (SL-PRS) resource reservation message within resources in a SL communication resource pool, wherein the first SL-PRS resource reservation message identifies a first SL-PRS resource within a SL-PRS resource pool, and the SL communication resource pool is different from the SL-PRS resource pool; and transmitting a first SL-PRS in the first SL-PRS resource within the SL-PRS resource pool.

14. The method of claim 13, further comprising:

receiving a second SL-PRS resource reservation message in within the resources the SL communication resource pool from another wireless communication device, wherein the second SL-PRS resource reservation message identifies a second SL-PRS resource within the SL-PRS resource pool; and selecting the first SL-PRS resource from resources within the SL-PRS resource pool that exclude the second SL-PRS resource.

15. The method of claim 13, further comprising at least one of:

transmitting the first SL-PRS utilizing a given time resource of the SL-PRS resource pool over an entirety of a bandwidth of the SL-PRS resource pool; or transmitting the first SL-PRS utilizing the given time resource of the SL-PRS resource pool over a sub-band of the bandwidth of the SL-PRS resource pool.

16. The method of claim 13, further comprising at least one of:

transmitting the first SL-PRS in the SL-PRS resource pool once, transmitting the first SL-PRS in the SL-PRS resource pool more than once, transmitting the first SL-PRS as one of a predetermined plurality of transmitted respective SL-PRSs in a corresponding plurality of respective SL-PRS resource pools, or transmitting the first SL-PRS as one of a semi-statically configured transmission of a plurality of respective SL-PRSs in the corresponding plurality of respective SL-PRS resource pools.

17. The method of claim 13, further comprising:
reserving a different SL-PRS resource identified in a different SL-PRS resource reservation message for use by another wireless communication device.

18. The method of claim 13, further comprising:
reserving the first SL-PRS resource in the first SL-PRS resource reservation message for a shared use by the wireless communication device and another wireless communication device.

19. A wireless communication device in a wireless communication network, comprising:
a transceiver;
a memory; and
a processor communicatively coupled to the transceiver and the memory, wherein the processor and the memory are configured to utilize the transceiver to:
receive a first sidelink-positioning reference signal (SL-PRS) resource reservation message within resources in a SL communication resource pool, wherein the first SL-PRS resource reservation message identifies a first SL-PRS resource within a SL-PRS resource pool, and the SL communication resource pool is different from the SL-PRS resource pool; and
receive a first SL-PRS in the first SL-PRS resource within the SL-PRS resource pool.

20. The wireless communication device of claim 19, wherein the SL-PRS resource pool is reserved for SL-PRS signaling and the SL communication resource pool is reserved for communication of at least one sidelink control or sidelink data.

21. The wireless communication device of claim 19, wherein the first SL-PRS is received in an absence of receiving of a control signal associated with the first SL-PRS in resources within the SL-PRS resource pool.

22. The wireless communication device of claim 19, wherein the processor and the memory are further configured to:
receive a second SL-PRS resource reservation message within the resources in the SL communication resource pool, wherein the second SL-PRS resource reservation message identifies a second SL-PRS resource within the SL-PRS resource pool; and
receive a second SL-PRS in the second SL-PRS resource within the SL-PRS resource pool, wherein the second SL-PRS resource is different from the first SL-PRS resource.

23. The wireless communication device of claim 19, wherein the first SL-PRS resource reservation message identifies a given time in the SL-PRS resource pool corresponding to transmission of the first SL-PRS.

24. The wireless communication device of claim 19, wherein the first SL-PRS resource reservation message identifies a starting resource element in the SL-PRS resource pool corresponding to transmission of the first SL-PRS.

25. The wireless communication device of claim 19, wherein the first SL-PRS is mapped to the first SL-PRS resource in a comb pattern.

26. The wireless communication device of claim 19, wherein the processor and the transceiver are further configured to least one of:
receive the first SL-PRS utilizing a given time resource of the SL-PRS resource pool over an entirety of a bandwidth of the SL-PRS resource pool; or
receive the first SL-PRS utilizing the given time resource of the SL-PRS resource pool over a sub-band of the bandwidth of the SL-PRS resource pool.

27. The wireless communication device of claim 19, wherein the processor and the transceiver are further configured to least one of:
receive the first SL-PRS in the SL-PRS resource pool once,
receive the first SL-PRS in the SL-PRS resource pool more than once,
receive the first SL-PRS as one of a predetermined plurality of received respective SL-PRSs in a corresponding plurality of respective SL-PRS resource pools, or
receive the first SL-PRS as one of a semi-statically configured transmission of a plurality of respective SL-PRSs in the corresponding plurality of respective SL-PRS resource pools.

28. The wireless communication device of claim 19, wherein the wireless communication device is one of at least two wireless communication devices in a group of wireless communication devices that together utilize respective round trip time measurements, based on transmissions of respective SL-PRSs, including the first SL-PRS, to determine a physical location of the wireless communication device.

29. The wireless communication device of claim 19, wherein the first SL-PRS resource reserved in the first SL-PRS resource reservation message is reserved by the wireless communication device for use by another wireless communication device.

30. The wireless communication device of claim 19, wherein the first SL-PRS resource reserved in the first SL-PRS resource reservation message reserves the first SL-PRS resource for shared use by the wireless communication device and another wireless communication device.

* * * * *